(12) United States Patent
Ueshima et al.

(10) Patent No.: US 7,555,105 B2
(45) Date of Patent: Jun. 30, 2009

(54) MAIL EXCHANGE APPARATUS, MAIL EXCHANGE SYSTEM, STORAGE MEDIUM AND MAIL EXCHANGE METHOD

(75) Inventors: Hiromu Ueshima, Shiga (JP); Akira Muto, Tokyo (JP)

(73) Assignee: SSD Company Limited, Shiga (JP)

( * ) Notice: Subject to any disclaimer, the term of this patent is extended or adjusted under 35 U.S.C. 154(b) by 835 days.

(21) Appl. No.: 11/077,187

(22) Filed: Mar. 10, 2005

(65) Prior Publication Data

US 2005/0204010 A1 Sep. 15, 2005

(30) Foreign Application Priority Data

Mar. 10, 2004 (JP) ............... P. 2004-066458

(51) Int. Cl.
*H04M 1/24* (2006.01)
(52) U.S. Cl. ............... 379/88.22; 379/88.08; 379/88.11
(58) Field of Classification Search ............. 379/88.22, 379/88.08–88.11
See application file for complete search history.

(56) References Cited

U.S. PATENT DOCUMENTS 6,070,205 A 5/2000 Kato et al.

FOREIGN PATENT DOCUMENTS

JP 4-37228 2/1992
JP 10-307790 11/1998

OTHER PUBLICATIONS

Imation—Celebrating Over 50 Years of Tape Storage.*
Imation—Support USB Flash Drives.*
Imation Drive Image.*
Imation USB Flash Drives.*

* cited by examiner

*Primary Examiner*—Simon Sing
(74) *Attorney, Agent, or Firm*—Osha • Liang LLP

(57) ABSTRACT

The memory cartridge which has identification data corresponding to its appearance is inserted to the mail exchange apparatus. The mail exchange apparatus displays a content of mail read from the inserted memory cartridge and an animal image corresponding to its identification data on the television monitor.

4 Claims, 25 Drawing Sheets

|     | A | B | C | D | E | F | G | H |
|-----|---|---|---|---|---|---|---|---|
| ID2 | 0 | 0 | 0 | 0 | 0 | 0 | 0 | 1 |
| ID3 | 0 | 0 | 0 | 0 | 0 | 0 | 1 | 0 |
| ID4 | 0 | 0 | 0 | 0 | 0 | 1 | 0 | 0 |
| ID5 | 0 | 0 | 0 | 0 | 1 | 0 | 0 | 0 |
| ID6 | 0 | 0 | 0 | 1 | 0 | 0 | 0 | 0 |
| ID7 | 0 | 0 | 1 | 0 | 0 | 0 | 0 | 0 |

US 7,555,105 B2

MAIL EXCHANGE APPARATUS, MAIL EXCHANGE SYSTEM, STORAGE MEDIUM AND MAIL EXCHANGE METHOD

This application claims foreign priority based on Japanese Patent application No. 2004-66458, filed Mar. 10, 2004, the contents of which is incorporated herein by reference in its entirety.

BACKGROUND OF THE INVENTION

1. Field of the Invention

The present invention is related to a mail exchange apparatus which accesses a storage medium as inserted and reads mail from the storage medium, and the related techniques thereof.

2. Description of the Related Art

A card mail exchange method is described in Jpn. unexamined patent publication No. 04-37228 (referred to as the Patent Document in the following explanation). This card mail method contains a card and a mail box. The card includes a user ID storage unit, an address storage unit, a sent mail storage unit, a sender storage unit, and a received mail storage unit. The mail box comprises a card reader unit, a card writer unit, a memory which stores mail with its destination and source.

When the card is inserted to the mail box, a user ID, a destination and a sent message are read from the card and stored to the memory in the mail box. On the other hand, mail for the user ID in the memory of the mail box is written to the received mail storage unit in the card. In this way, mail is kept in the form of a card. Therefore it is possible to carry it around and exchange mail through the mail box by easy operation.

However, users usually desire more high-value added products and services.

SUMMARY OF INVENTION

It is an object of the present invention to provide a value-added mail exchange apparatus which reads mails from the storage medium and also reads identification data of the storage medium and performs processing corresponding to the identification data, and the related techniques thereof.

In accordance with the first aspect of the present invention, the mail exchange apparatus in which a storage medium storing identification data corresponding to appearance of the storage medium can be inserted, said mail exchange apparatus comprises: a memory unit operable to store a mail message and the identification data read from the inserted storage medium; and a processor operable to display an image corresponding to the identification data stored in said memory unit and the mail message on a display device.

In accordance with this configuration, since the image in accordance with the identification data corresponding to the appearance of the inserted memory cartridge is displayed on the display device, the user who receives the memory cartridge can see, in addition to the mail message, the image corresponding to the appearance of the memory cartridge which inserted to the mail exchange apparatus. Therefore, the user can enjoy not only mail exchange, but also memory cartridge exchange as compared with the case where exchanging only the mail by using the general storage medium. Therefore, it is possible to provide the high-value added mail exchange apparatus.

In above mail exchange apparatus, said processor displays an object imitating the appearance of the storage medium as the image corresponding to the identification data on the display device.

In accordance with this configuration, since displaying on the display device is intimately related with the storage medium, the user can enjoy mail exchange more.

The above mail exchange apparatus further comprises a plurality of letter input keys, wherein said plurality of the letter input keys includes a predetermined number of letter input keys which are arranged in the same key arrangement as those of a mobile phone.

In accordance with this configuration, it is possible to improve the convenience of the users who are familiar with input operation of the mobile phone. In addition, it is possible for users who do not have the mobile phone to feel as though they are using mobile phone keys.

In accordance with the second aspect of the present invention, a mail exchange system comprises: a plurality of storage mediums each of which has different appearance and identification data corresponding to its appearance; and a mail exchange apparatus which reads a mail message and the identification data from said storage medium being inserted in said mail exchange apparatus, and displays an image corresponding to the identification data and the mail message on a display device, wherein said each storage medium is provided with a connector section to be connected with said mail exchange apparatus, and said plurality of the storage mediums has the same connector sections so as to be commonly insertable into said mail exchange apparatus.

In accordance with this configuration, the mail exchange system has same functions and effects as the mail exchange apparatus of the first aspect of this invention.

In the above mail exchange system, said each storage medium comprises: a first memory portion operable to store the identification data; and a second memory portion operable to store the mail message, wherein said first memory portion of a first storage medium of said plurality of the storage mediums includes a line which is connected to a corresponding terminal of said connector section and provides voltage information as the identification data of said first storage medium, a second storage medium of said plurality of the storage mediums further includes a shift register having an output terminal connected to a corresponding terminal of said connector section, and said first memory portion of said second storage medium includes a plurality of lines which is connected to a plurality of input terminals of said shift register and provides voltage information as the identification data of said second storage medium.

In accordance with this configuration, the first storage medium can store the identification data with a simple configuration. Also, it is possible to reduce the cost of the first storage medium. Especially, in case where the mail exchange apparatus and the memory medium(s) are sold in one package, it is possible to restrain the price of the mail exchange system if it is sold with the first memory medium. Therefore, it is possible to facilitate the spread of this mail exchange system. On the other hand, the first memory medium can provide only two kinds of identification data items (ID) due to the configuration. However, the second memory medium can provide many kinds of identification data items (ID). Therefore, if the second memory medium is sold alone, it is possible to sell various memory mediums bearing different appearances. In this case, the cost of the second memory medium becomes higher than the first memory medium because the second memory medium includes the shift register and the cost of the shift register is added to the price of the second memory medium. However, this is not considered to be expensive for the user because it is cheaper than the price of the mail exchange apparatus. Also, since the shift register of the second storage medium receives parallel data and outputs serial data, it is possible not only to provide different available instances of identification data in a number corresponding to the second power of (the number of the lines) but also to reduce the number of the terminals of the connector section.

In accordance with the third aspect of the present invention, a storage medium storing an identification data corresponding to an appearance of the storage medium, said storage medium being inserted to a mail exchange apparatus which comprises a memory unit operable to store a mail message and the identification data, and a processor operable to display an image corresponding to the identification data stored in said memory unit and the mail message on a display device, said storage medium includes: a first memory portion operable to store the identification data corresponding to the appearance of said storage medium; a second memory portion operable to store the mail message; and a connector section to be connected with the mail exchange apparatus.

In the above storage medium, said first memory portion includes a line which is connected to a corresponding terminal of said connector section and provides voltage information as the identification data.

In the above storage medium, the storage medium further comprises a shift register having an output terminal connected to a corresponding terminal of said connector section, wherein said first memory portion includes a plurality of lines which is connected to a plurality of input terminals of said shift register, and voltage information on said plurality of the lines serves as the identification data.

In accordance with the fourth aspect of the present invention, a mail exchange method wherein a storage medium in which identification data corresponding to appearance of the storage medium is stored is used, said mail exchange method comprises: reading mail data from the storage medium; reading the identification data from the storage medium; displaying a mail massage in accordance with the mail data as read; and displaying an image corresponding to the identification data as read.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF THE PREFERRED EMBODIMENTS

In what follows, an embodiment of the present invention will be explained in conjunction with the accompanying drawings. Meanwhile, like references indicate the same or functionally similar elements throughout the respective drawings, and therefore redundant explanation is not repeated.

Figure 1:
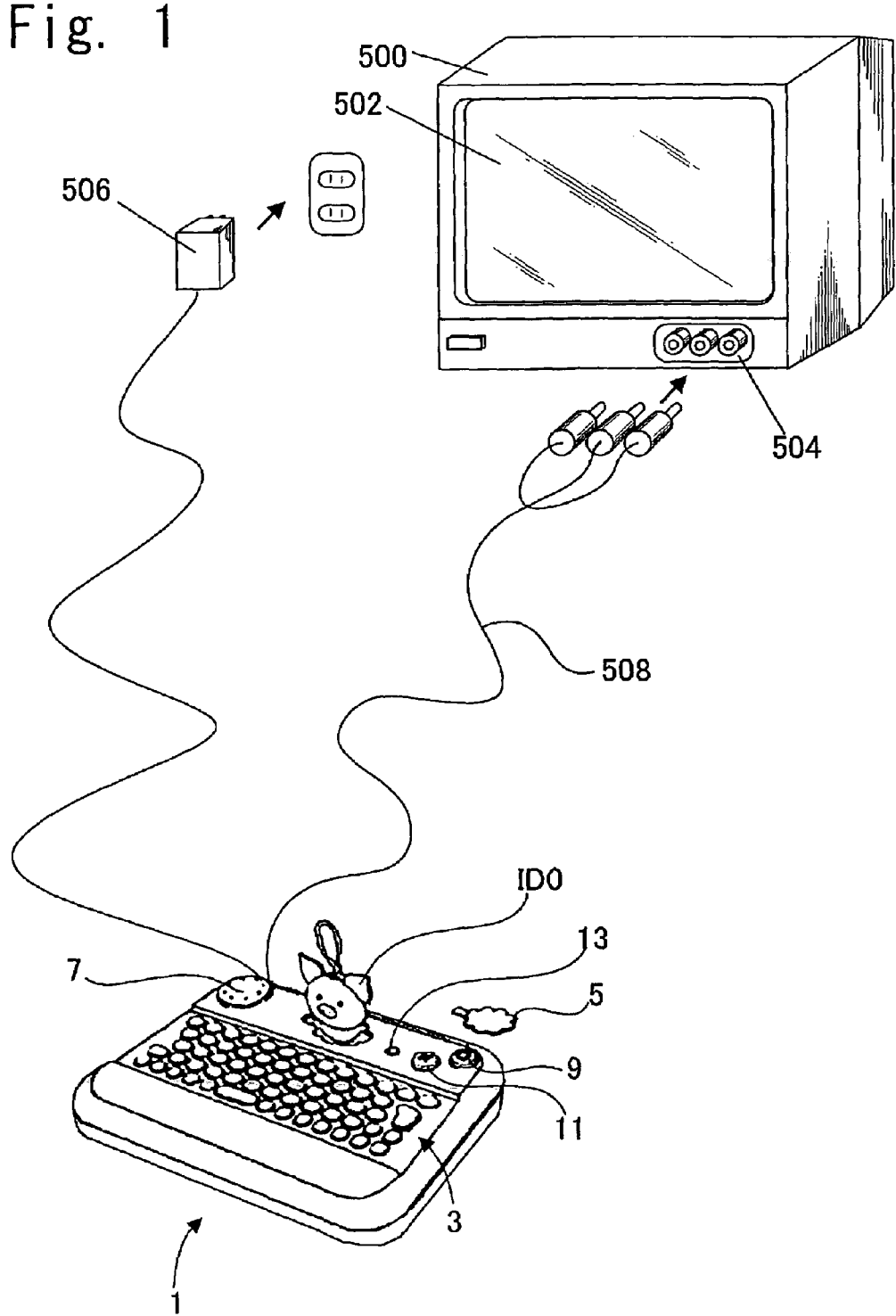
FIG. 1 is a view showing the overall configuration of a mail exchange system in accordance with the embodiment of the present invention.

FIG. 1 is a view showing the overall configuration of a mail exchange system in accordance with the embodiment of the present invention. As illustrated in FIG. 1, the mail exchange system includes a mail exchange apparatus 1 and a memory cartridge ID0. The mail exchange apparatus 1 is provided with a selection cursor controller 7, a power switch 13, a cancel key 11, a decision key 9 and a key area 3 on the top surface. A television monitor 500 is provided with a screen 502 on its front and an AV terminal 504 below the screen 502.

The mail exchange apparatus 1 is connected to the television monitor 500 by an AV cable 508. More specifically, an AV terminal 151 (explained later) of the mail exchange apparatus 1 and the AV terminal 504 of the television monitor 500 are connected by the AV cable 508. In addition, a DC power voltage is supplied to the mail exchange apparatus 1 through an AC adapter 506. Alternatively, it is possible to use a battery (not shown) to supply the DC power voltage in place of the AC adapter 506.

In what follows, the operation will be briefly explained. When a user inserts a memory cartridge ID0 received from other person to the mail exchange apparatus 1, a mail message stored in the memory cartridge ID0 is read and displayed on the screen 502. In this case, animation in which an animal object with appearance of the memory cartridge ID0 delivers a letter is displayed. In the present embodiment, eight kinds of memory cartridges ID0 to ID7 are used as an example. Each memory cartridge ID0 to ID7 has its own identification data (ID), therefore an animal object corresponding to each ID is displayed on the screen 502.

On the other hand, the user can write a reply on the screen 502 by operating the selection cursor controller 7, the cancel key 11, the decision key 9 and various keys in the key area 3, and stores it in the memory cartridge ID0. If the user gives the memory cartridge ID0 in which the reply is stored to the other person, the other parson can read and write a mail message as well.

Figure 2:
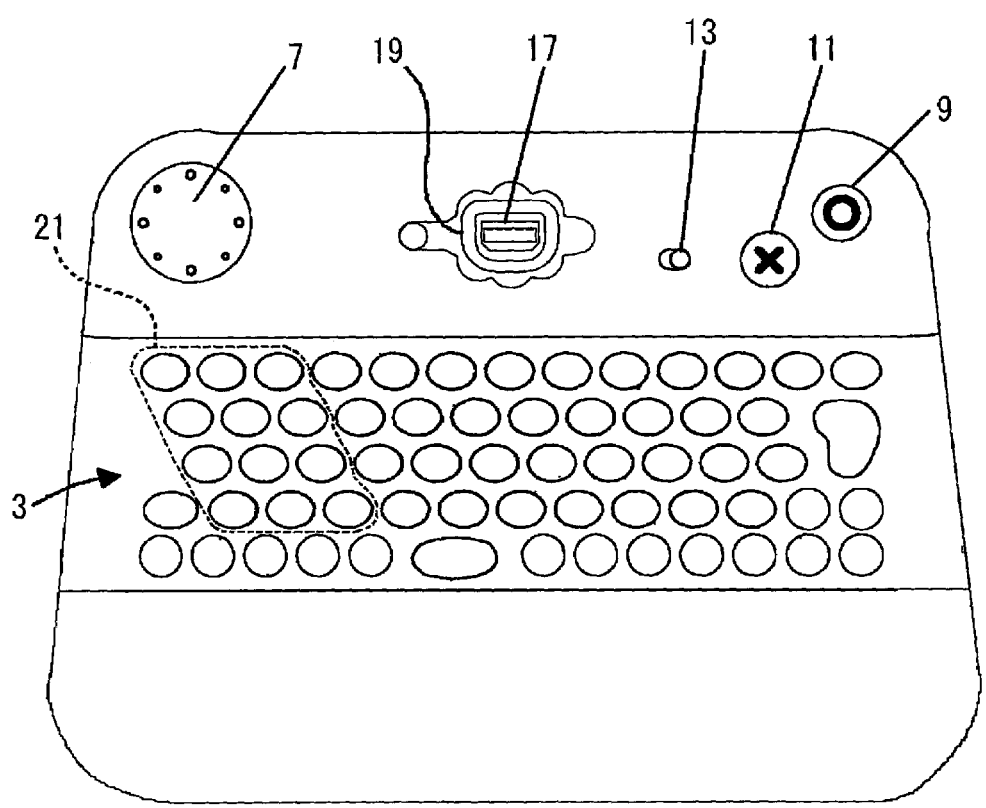
FIG. 2 is a plan view of a mail exchange apparatus 1 of FIG. 1.
Figure 3:
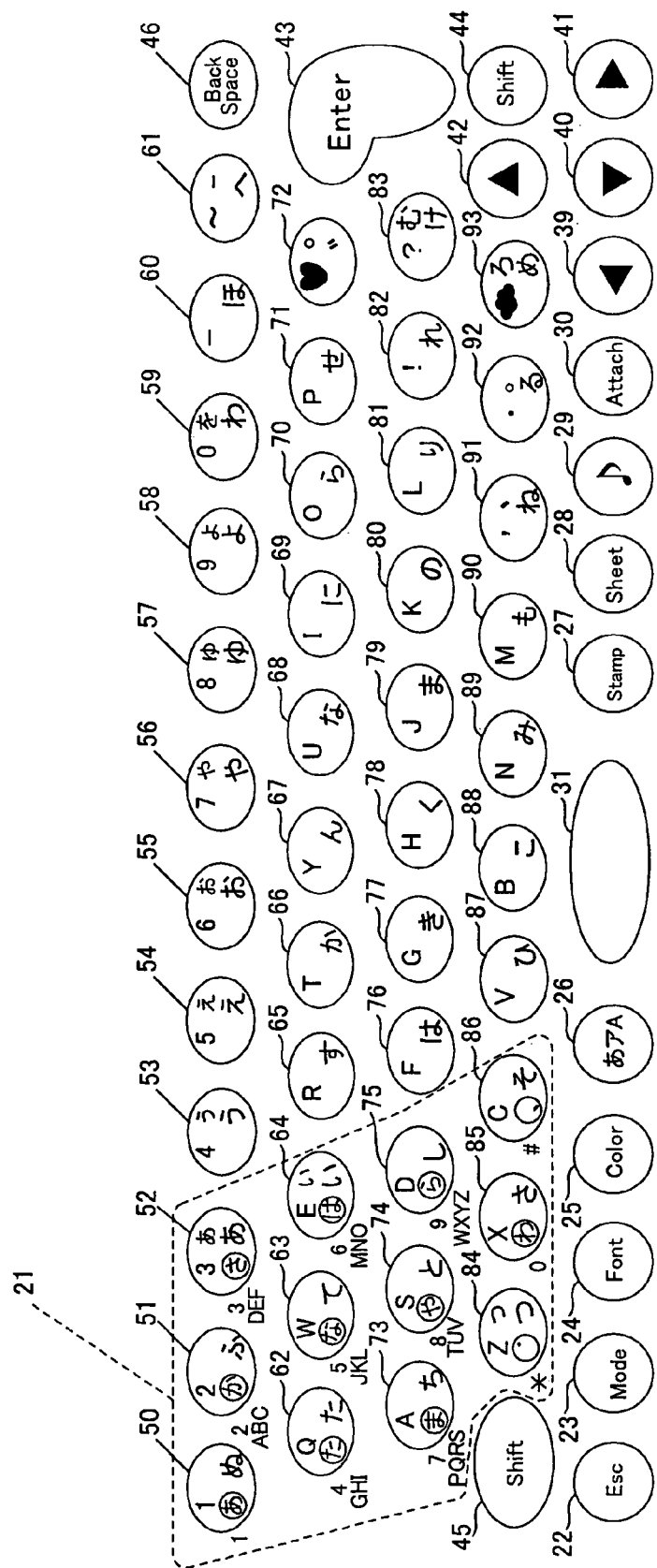
FIG. 3 is an enlarged view of key area 3 of FIG. 2.

FIG. 2 is a plan view of the mail exchange apparatus 1 of FIG. 1. FIG. 3 is an enlarged view of the key area 3 of FIG. 2. As illustrated in FIG. 3, the key area 3 of FIG. 2 includes character input keys 50 to 93, an enter key 43, shift keys 44 and 45, direction keys 39 to 42, a back space key 46, function keys 22 to 30 and a space key 31.

The character input keys 50 to 93 are keys to enter characters, numbers and marks. The enter key 43 is a key mainly used to start a new line. The shift keys 44 and 45 are auxiliary keys to give another function to the other key by pressing with it. The direction keys 39 to 42 are keys mainly used to move a text cursor to be explained later, and to select a menu. The back space key 46 is a key mainly used to delete letters, numbers and marks. The space key 31 is a key mainly used to enter a space and perform convert operation. The above mentioned keys such as the character input keys 50 to 93, the enter key 43, the shift keys 44 and 45, the direction keys 39 to 42, the back space key 46 and the space key 31 have same functionality as keys of a general keyboard.

The function key 22 is an escape key. The function key 23 is used for changing an input mode of letter. In the present embodiment, three types of input modes such as a Kana input mode, a Roman alphabet input mode and a mobile phone input mode are provided. The function key 24 is used to change a font. The function key 25 is used to change a font color. The function key 26 is used to change a type of letters (Hiragana/Katakana/alphabet/number). The function key 27 is used to enter a stamp. The function key 28 is used to change a background (i.e. a letter form) on which a message is written. The function key 29 is used to add effective sound to a mail. The function key 30 is used to attach a file with a mail. When the function key 23 is pressed, an input mode selection screen (not shown) is displayed on the screen 502. Then, the user can select a desired type of input mode (one of the Kana input mode, the Roman alphabet input mode and the mobile phone input mode) by using the direction keys 39 to 42.

The mobile phone input mode will be explained. In this mode, the user can input in the same way as a general mobile phone by using the character input keys 50 to 52, 62 to 64, 73 to 75 and 84 to 86 in a mobile phone key arrangement area 21. More detailed explanation is as follow. The circled letter at the lower left on the surface of each character input key 50 to 52, 62 to 64, 73 to 75 and 84 to 86 is a letter to be input when a Hiragana type is selected as a letter type. The number at the lower left beside each the character input key 50 to 52, 62 to 64, 73 to 75 and 84 to 86 is a number to be input when a number type is selected as a letter type. The alphabet at the lower left beside each the character input key 50 to 52, 62 to 64, 73 to 75 and 84 to 86 is an alphabet to be input when an alphabet type is selected as a letter type.

Incidentally, it is not limited to the character input keys 84 and 86 to be assigned a voiced consonant mark, a punctuation mark and a symbol functions. Other keys such as the character input keys 50 to 52, 62 to 64, 73 to 75 and 85 can be used instead of the character input keys 84 and 86.

Figure 4A:
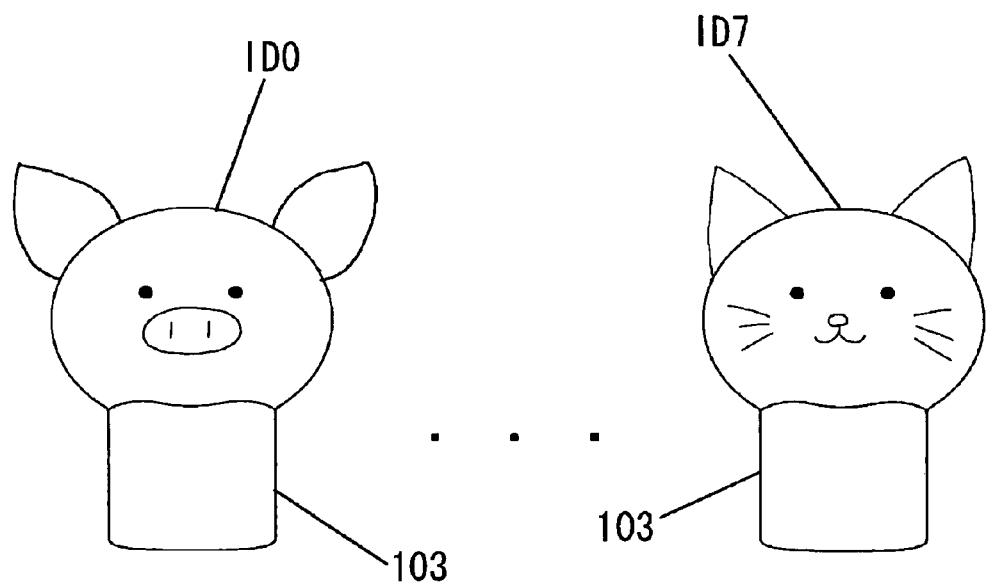
FIG. 4A is a front view of memory cartridges ID0 to ID7 in the present embodiment.
Figure 4B:
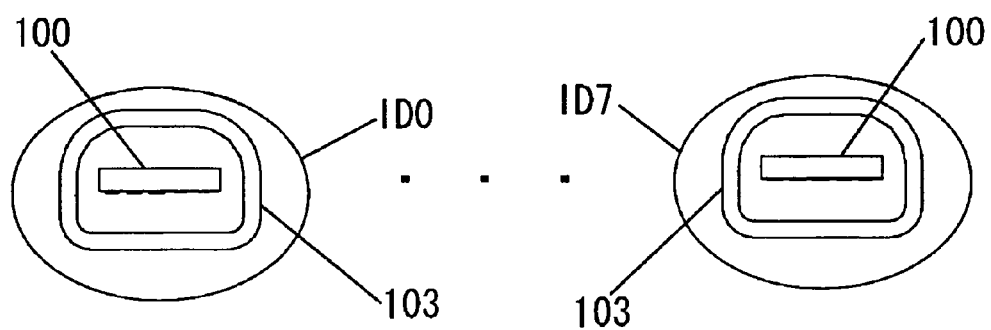
FIG. 4B is a bottom view of the memory cartridges ID0 to ID7.

FIG. 4A is a front view of the memory cartridge ID0 to ID7 in the present embodiment. FIG. 4B is a bottom view of the memory cartridge ID0 to ID7. As illustrated in FIG. 4A, the appearance of each memory cartridge ID0 to ID7 is different and made in form of an animal. Each memory cartridge ID0 to ID7 stores the different identification data. However, all of them have same shape and size of connector section 103 for connecting to the mail exchange apparatus 1.

As illustrated in FIG. 4B, the connector section 103 is formed into cylindrical shape, and a substrate 100 is secured inside of the memory cartridge. The connector section 103 and the substrate 100 of each memory cartridge ID0 to ID7 is inserted to a groove portion 19 and a socket 17 of the mail exchange apparatus 1 of FIG. 2. In this way, one of the memory cartridges ID0 to ID7 is fitted to the mail exchange apparatus 1.

Figure 5:
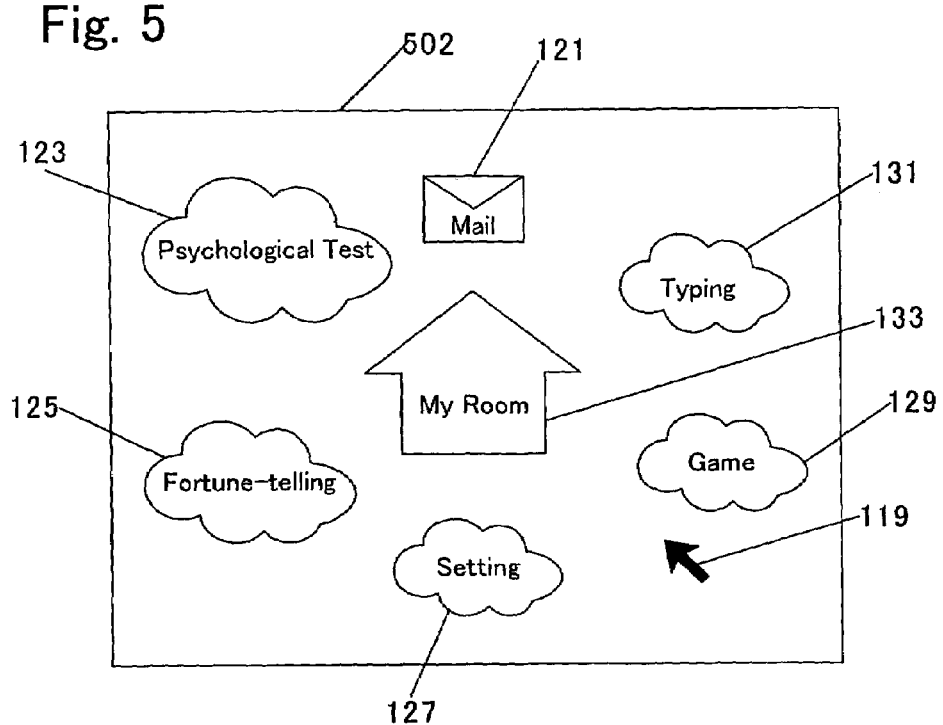
FIG. 5 is a view showing a menu screen displayed on a screen 502 of FIG. 1.

FIG. 5 is a view showing the menu screen displayed on the screen 502 of FIG. 1. As illustrated in FIG. 5, the menu screen includes a mail selecting object 121, a psychological test selecting object 123, a fortune-telling selecting object 125, a setting selecting object 127, a game selecting object 129, a typing selecting object 131, a my room selecting object 133 and a selection cursor 119.

A user operates the selection cursor controller 7 to move the selection cursor 119 to desired one of the objects 121 to 133 and presses the decision key 9. Then the process corresponding to each object 121 to 133 is performed. More detailed explanation is as follow. When the mail selecting object 121 is selected, the mail process is performed. This will be explained later. Incidentally, the mail selecting object 121 is displayed only when one of the memory cartridges ID0 to ID7 is inserted to the mail exchange apparatus 1. As explained above, the selection cursor controller 7 is used for moving the selection cursor 119.

When the psychological test selection object 123 is selected, the process for performing psychological test is performed and a screen for psychological test is displayed on the screen 502. When the fortune-telling selecting object 125 is selected, the process for performing fortune-telling is performed and a screen for fortune-telling is displayed on the screen 502. When the setting selecting object 127 is selected, a screen for performing various settings is displayed on the screen 502, therefore the user can perform various settings. For example, the user can perform the selection cursor speed controlling, key sound setting, BGM setting, my room key setting and so on.

When the game selecting object 129 is selected, a game screen is displayed on the screen 502 and the user can play the game. For example, the user can enjoy playing a block breaking game, an item and a character catching game and so on. When the my room selecting object 133 is selected, a screen showing inside of a room is displayed. The room image includes furniture such as a bed, electrical appliances such as a computer and a television, clothes and accessories. The user can arrange items and characters obtained from games in the room.

Figure 6:
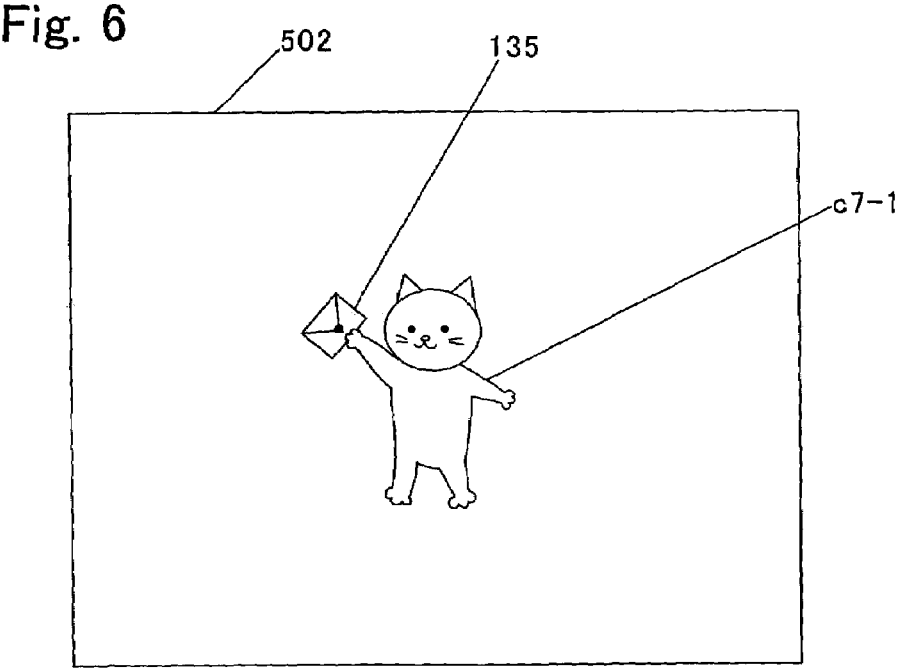
FIG. 6 is a view showing an example of animation displayed immediately after a mail selecting object 121 of FIG. 5 is selected.

The mail process will be described in detail. FIG. 6 is a view showing an example of animation displayed immediately after the mail selecting object 121 of FIG. 5 is selected. In FIG. 6, the memory cartridge ID7 in form of a cat is inserted to the mail exchange apparatus 1. As illustrated in FIG. 6, animation in which an animal (cat) object c7-1 corresponding to the identification data of the memory cartridge ID7 is delivering a letter 135 is displayed on the screen 502 when the mail selecting object 121 is selected. After that, a mail selecting screen will be displayed.

Figure 7:
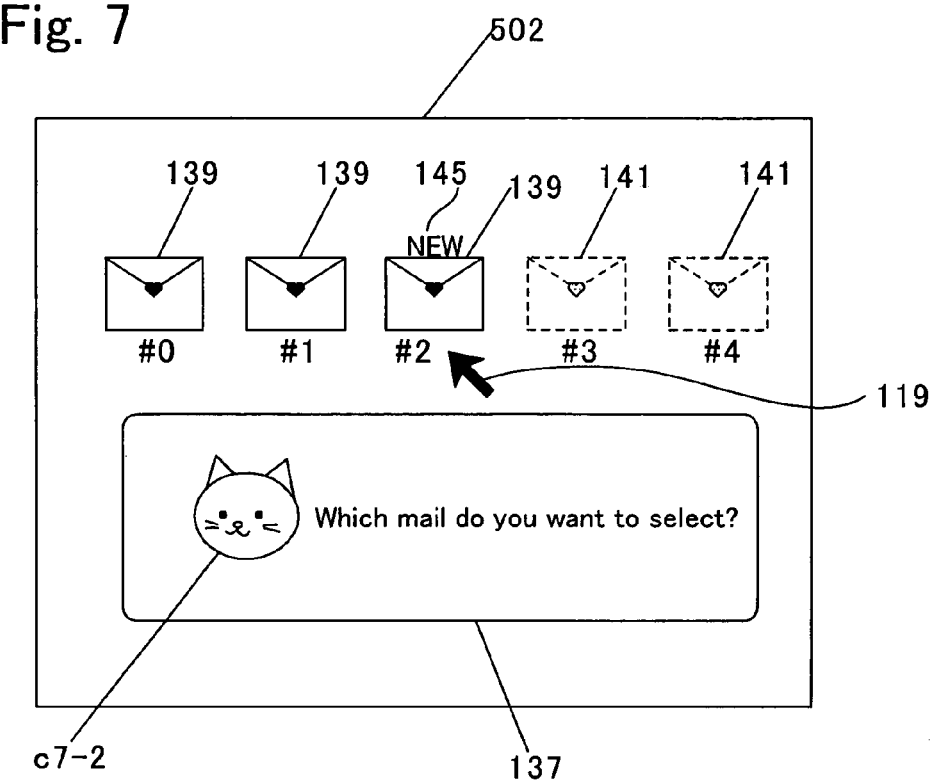
FIG. 7 is a view showing a mail selecting screen in the present embodiment.

FIG. 7 is a view showing the mail selecting screen in the present embodiment. As illustrated in FIG. 7, the mail selecting screen displayed on the screen 502 includes mail objects 139 and 141, unopened indicating object 145 (the word "NEW" is used in this example), the selection cursor 119, an animal (cat) object c7-2 and a guide displaying portion 137.

For example, each memory cartridge ID0 to ID7 can store five mail pieces #0 to #4 in the present embodiment. Either of the mail objects 139 and 141 is displayed corresponding to each mail piece #0 to #4. The mail objects 139 with solid lines indicate that the corresponding mail pieces #0 to #2 have already been written a message (used). Therefore, the mail pieces #0 to #2 corresponding to the mail objects 139 can not be written a message.

On the other hand, the mail objects 141 with dashed lines indicate that the corresponding mail pieces #3 and #4 have not been written a message (unused). Therefore, the mail pieces #3 and #4 corresponding to the mail objects 141 still can be written a message.

The mail piece #2 corresponding to the mail object 139 accompanied by the unopened indicating object 145 has been unopened. On the other hand, the mail pieces #0 and #1 corresponding to the mail objects 139 without the unopened indicating object 145 have already been opened.

The animal (cat) object c7-2 corresponding to the identification data of the inserted memory cartridge ID7 is displayed in the guide displaying portion 137. In addition, a guide sentence corresponding to location where the selection cursor 119 exists is displayed in the guide displaying portion 137. In case where the selection cursor 119 exists neither on the mail object 139 nor 141, the sentence "Which mail do you select?" is displayed. When the selection cursor 119 exists on the mail object 139, the sentence "Do you want to read this mail message?" is displayed. When the selection cursor 119 exists on the mail object 141, the sentence "Do you want to write a mail message?" is displayed.

Figure 8:
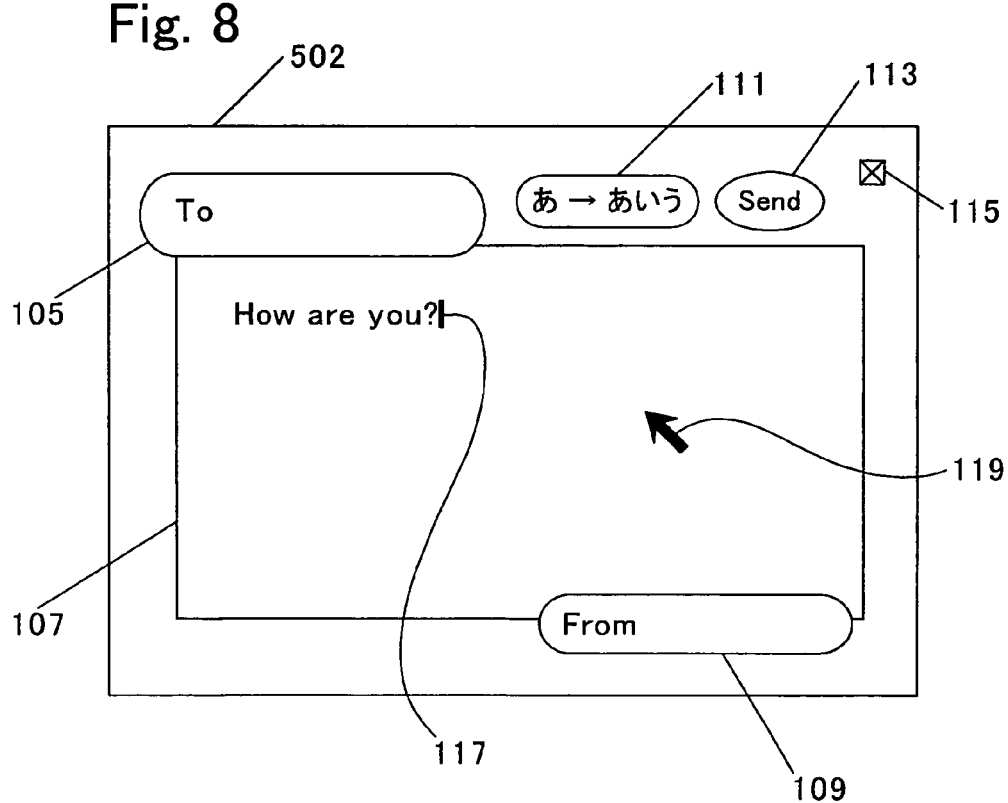
FIG. 8 is a view showing a mail creation screen displayed on the screen 502 of FIG. 1.

If the decision key 9 is pressed when the selection cursor 119 is on the mail object 141, a mail creation screen will be displayed. FIG. 8 is a view showing the mail message creation screen displayed on the screen 502 of FIG. 1. As illustrated in FIG. 8, the mail message creation screen includes a destination displaying portion 105, a source displaying portion IO9, an input mode displaying portion 111, a send button 113, an end button 115, the selection cursor 119, a text cursor 117 and a writing portion 107.

The user can enter a receiver's name (other person's name) in the destination displaying portion 105 by operating various keys 3, 9 and 11 and the selection cursor controller 7. In this way, the user also can enter a sender's name (user's name) in the source displaying portion 109 and enter a desired message in the writing portion 107. The currently used letter input mode is displayed in the input mode displaying portion 111. The send button 113 is used for writing a created mail message (a created mail piece) to the memory cartridge ID7. In other words, the created mail message is written to the memory cartridge ID7 when the selection cursor 119 is brought to the send button 113 and the decision key 9 is pressed.

The end button 115 is used for returning to the menu screen. In other words, the menu screen is displayed when the selection cursor 119 is brought to the end button 115 and the decision key 9 is pressed. The text cursor 117 can be moved to desired location by using the direction keys 39 to 42. A letter is entered where this text cursor 117 is.

Figure 9:
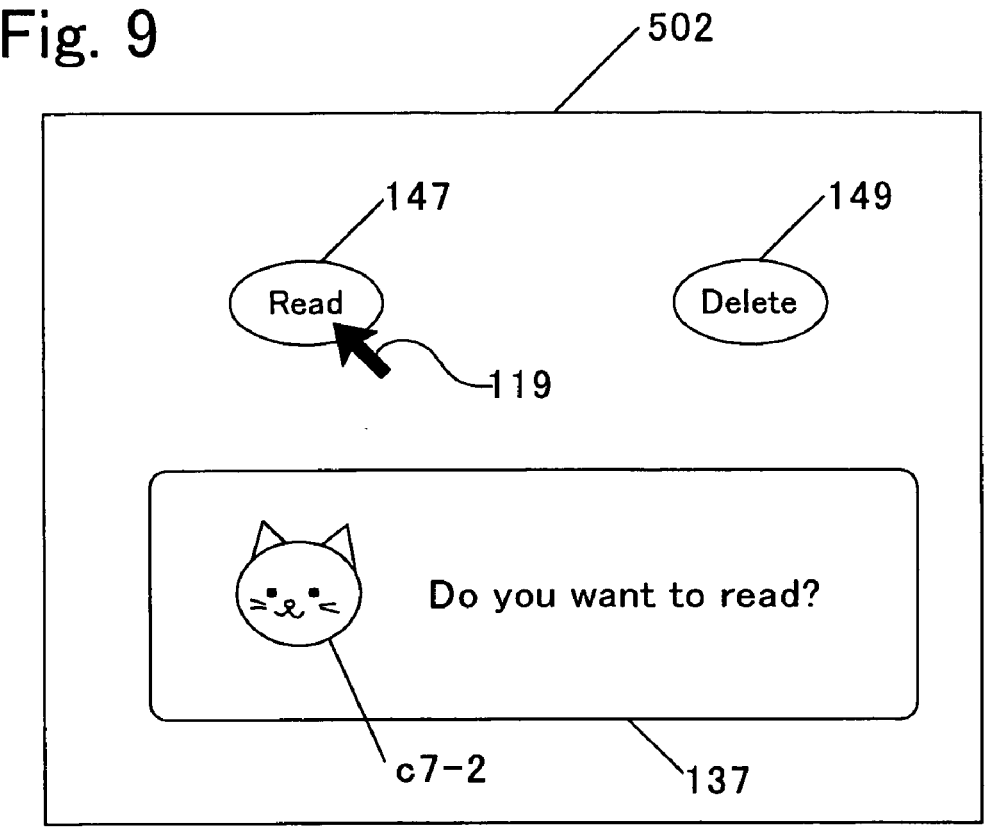
FIG. 9 is a view showing a read/delete selection screen displayed on the screen 502 of FIG. 1.

Returning to FIG. 7, if the decision key 9 is pressed when the selection cursor 119 exists where the mail object 139 is, a read/delete selection screen is displayed. FIG. 9 is a view showing the read/delete selection screen displayed on the screen 502 of FIG. 1. As illustrated in FIG. 9, the read/delete selection screen includes a read button 147, a delete button 149, the guide displaying portion 137 and the animal (cat) object c7-2.

If the decision key 9 is pressed when the selection cursor 119 exists where the read button 147 is, a mail read screen is displayed. This mail read screen is similar to the mail creation screen of FIG. 8 without the send button 113 and the input mode displaying portion 111. In this mail read screen, contents of the mail piece #0, #1 or #2 corresponding to the mail object 139 selected in the mail selecting screen of FIG. 7 are displayed.

On the other hand, if the decision key 9 is pressed when the selection cursor 119 exists where the delete button 149 is, contents of the mail piece #0, #1 or #2 corresponding to the mail object 139 selected in the mail selecting screen of FIG. 7 will be deleted.

Figure 10:
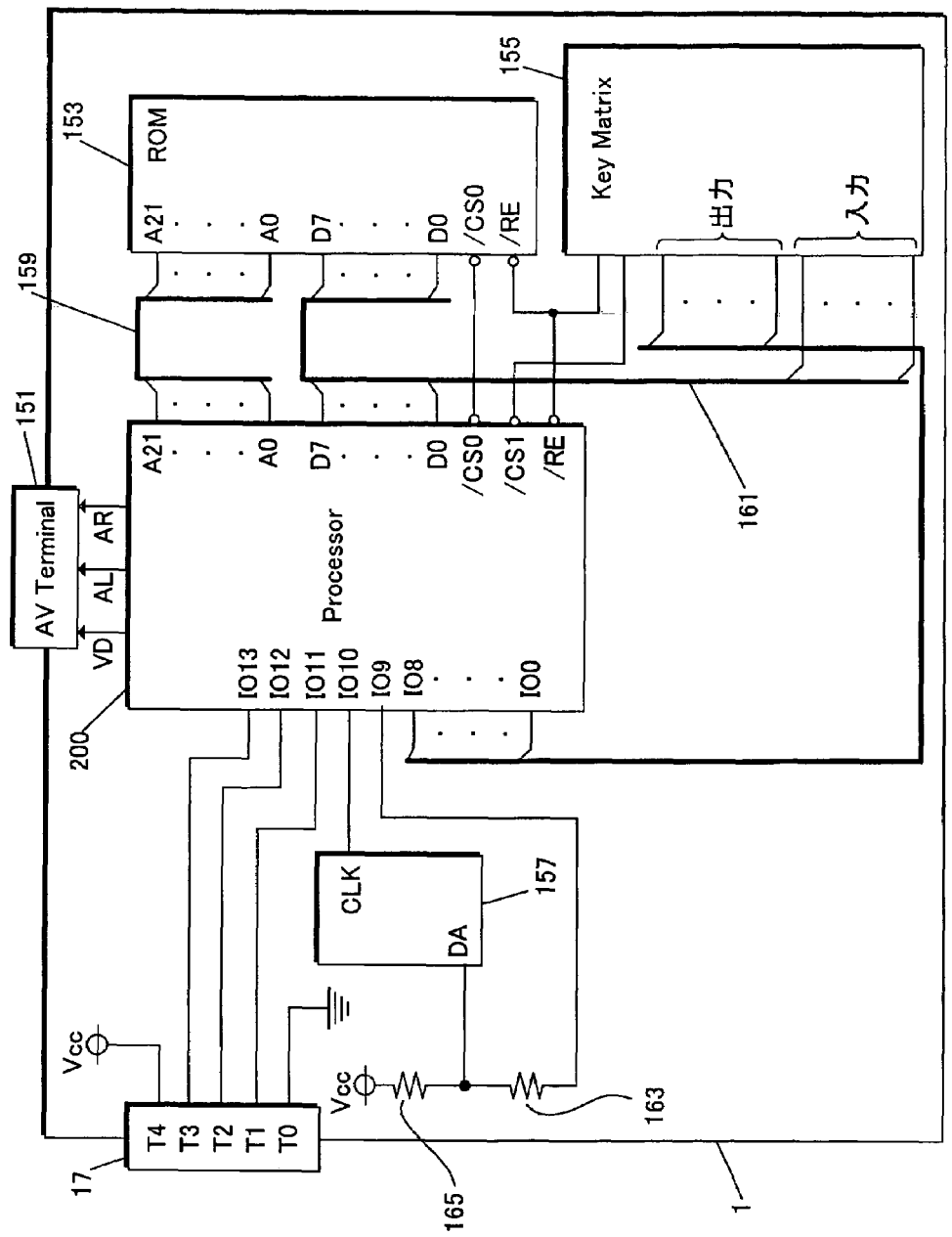
FIG. 10 is a view showing the electrical construction of the mail exchange apparatus 1 of FIG. 1.

FIG. 10 is a view showing the electrical construction of the mail exchange apparatus 1 of FIG. 1. As illustrated in FIG. 10, the mail exchange apparatus 1 includes a processor 200, a ROM (read only memory) 153, an EEPROM (electrically erasable and programmable read only memory) 157, a key matrix 155, an AV terminal 151, a socket 17, resistance elements 163 and 165, an address bus 159 and a data bus 161.

The processor 200 can access the ROM 153 through the address bus 159 and the data bus 161. Therefore, the processor 200 can read and execute a program stored in the ROM 153, and also read and process data stored in the ROM 153. Then, the processor 200 generates a video signal VD and audio signals AL and AR, and outputs them through the AV terminal 151. In this way, an image is displayed on the television monitor 500, and sound is output from the speakers of the television monitor 500.

In addition, the processor 200 controls input/output ports IO0 to IO8 and scans the key matrix 155. The result of scanning is transmitted to the processor 200 through the data bus 161, and then the processor 200 performs process corresponding to the result. This will be explained later.

A chip enable signal/CS0 which selects the ROM 153 is activated while a chip enable signal/CS1 which selects the key matrix 155 is deactivated. On the other hand, when the chip enable signal/CS1 which selects the key matrix 155 is activated, the chip enable signal/CS0 which selects the ROM 153 is deactivated. When the processor 200 reads data from the ROM 153 or the key matrix 155, a read enable signal/RE is activated.

Furthermore, the processor 200 can read data through the input/output port IO9 and write data in the EEPROM 157 through the input/output port IO9 by providing a clock signal to the EEPROM through IO10. For example, a user name, a profile, a game result and obtained items and characters are written in the EEPROM 157.

The processor 200 can access, through the input/output ports IO12 and IO13, the EEPROM 174 (to be explained later) equipped in the memory cartridges ID0 to ID7 inserted to the socket 17. This will be explained later.

Figure 11:
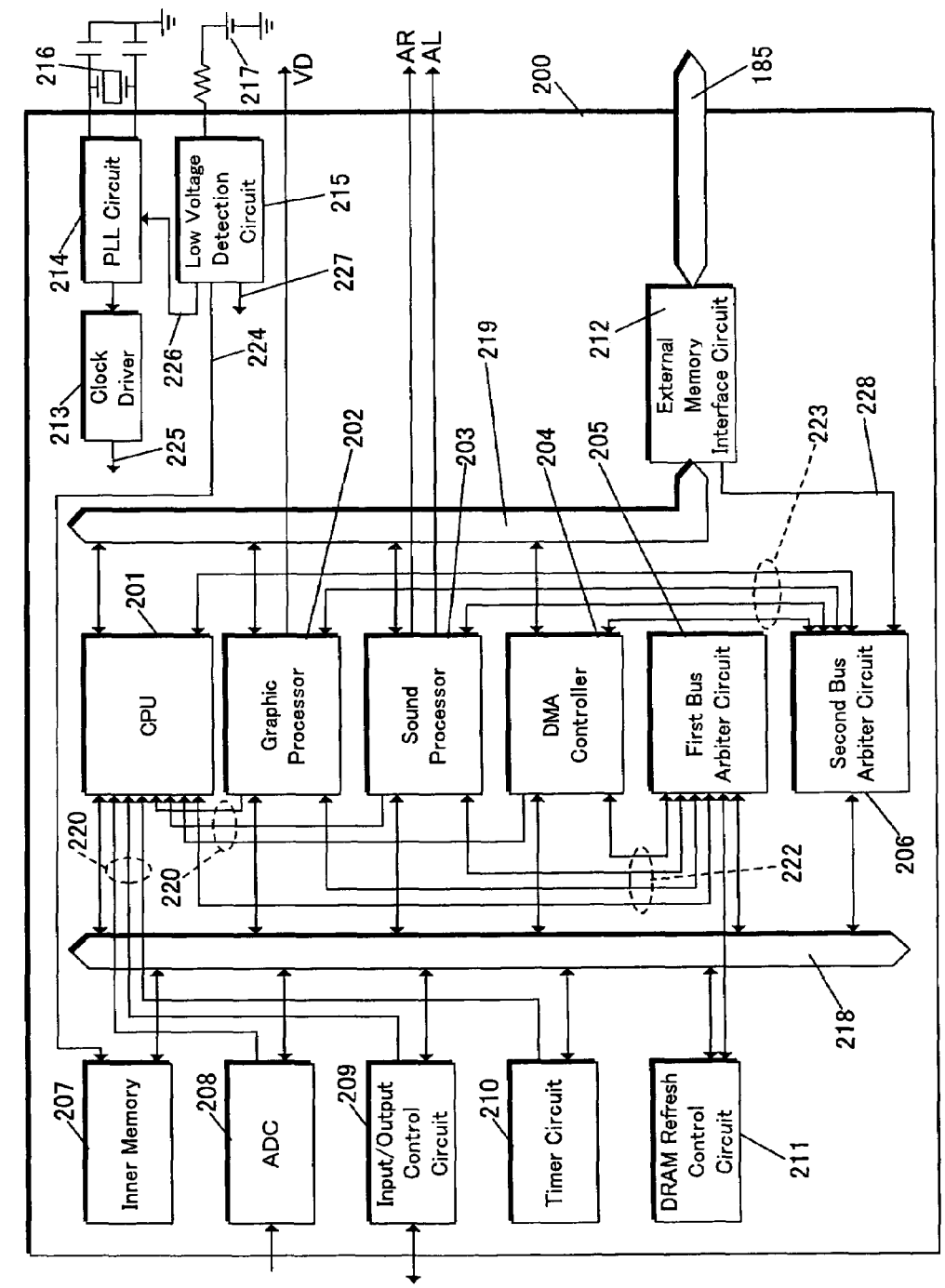
FIG. 11 is a block diagram of a processor 200 FIG. 10.

FIG. 11 is a block diagram of the processor 200 of FIG. 10. As shown in FIG. 11, this processor 200 includes a CPU (central processing unit) 201, a graphic processor 202, a sound processor 203, a DMA (direct memory access) controller 204, a first bus arbitrator circuit 205, a second bus arbitrator circuit 206, an inner memory 207, an A/D converter (ADC: analog to digital converter) 208, an I/O (input and output) control circuit 209, a timer circuit 210, a DRAM (dynamic random access memory) refresh control circuit 211, an external memory interface circuit 212, a clock driver 213, a PLL (phase-locked loop) circuit 214, a low voltage detector circuit 215, a first bus 218 and a second bus 219.

The CPU 201 performs various operations and controls the overall system in accordance with a program stored in the memory (the inner memory 207, or the ROM 153). In addition, the CPU 201 is a bus master of the first bus 218 and the second bus 219, and able to access resources connected with the each bus.

The graphic processor 202 is a bus master of the first bus 218 and the second bus 219. The graphic processor 202 synthesizes graphic data on the basis of data stored in the memory (the inner memory 207 or the ROM 153). Then, the graphic processor 202 generates the video signal VD modified for the television monitor 500 on the basis of the graphic data, and then outputs the video signal VD to the video signal output terminal 47.

Incidentally, the graphic data is synthesized from a background screen and sprites. The background screen consists of a two-dimensional array of the rectangular pixel aggregation and the size is big enough to cover the entire screen 502 of the television monitor 500. The first background screen and the second background screen are provided as the background screen in order to give depth. The sprite consists of a rectangular pixel aggregation operable to be arranged anywhere in the screen 502 of the television monitor 500. The rectangular pixel aggregation constituting the background screen and the sprite is referred as a character.

The graphic processor 202 is controlled by the CPU 201 via the first bus 218. In addition, the graphic processor 202 has the functionality of generating an interrupt request signal 220 to the CPU 201.

The sound processor 203 is a bus master of the first bus 218 and second bus address bus 219. The sound processor 203 synthesizes sound data on the basis of data stored in the memory (the inner memory 207 or the ROM 153). Then, the sound processor 203 generates the audio signals AL and AR on the basis of the sound data and then output them to the audio signal output terminal 151.

Incidentally, the sound data is synthesized by pitch conversion and amplitude modulation of PCM (pulse code modulation) data serving as the base data of tone quality. The volume control which is directed by the CPU 201 and the envelope control for replicating wave of a musical instrument as a function of the amplitude modulation are provided.

The sound processor 203 is controlled by the CPU 201 via the first bus 218. In addition, the sound processor 203 has the functionality of generating an interrupt request signal 220 to the CPU 201.

The DMA controller 204 controls data transfer from the ROM 153 to the inner memory 207. Also, the DMA controller 204 has the functionality of outputting, to the CPU 201, an interrupt request signal 220 indicative of the completion of the data transfer. The DMA controller 204 is a bus master of the first bus 218 and second bus 219. In addition, the DMA controller 204 is controlled by the CPU 201 via the first bus 218.

The inner memory 207 may be implemented with appropriate one of a mask ROM, an SRAM (static random access memory) and a DRAM in accordance with the system requirements. If data in SRAM has to be kept by a battery, a battery 217 is provided. In the case where a DRAM is used, the so called refresh cycle is periodically performed to maintain the data contained therein.

The first bus arbitrator circuit 205 accepts a first bus request signal from each bus master of the first bus 218, and performs arbitration, and then issues a first bus grant signal to each bus master. Each bus master is allowed to access the first bus 218 after receiving the first bus grant signal. In FIG. 11, the first bus request signal and the first bus grant signal are referred as first bus arbitration signals 222.

The second bus arbitrator circuit 206 accepts a second bus request signal from each bus master of the second bus 219, and performs arbitration, and then, issues a second bus grant signal to each bus master. Each bus master is allowed to access the second bus 219 after receiving the second bus grant signal. In FIG. 11, the second bus request signal and the second bus grant signal are referred as second bus arbitration signals 223.

The input/output control circuit 209 serves to perform input and output operations of input/output signals to enable the communication with external input/output device(s) and/or external semiconductor device(s). The read and write operations of input/output signals are performed by the CPU 201 through the first bus 218. Moreover, the input/output control circuit 209 has the functionality of generating an interrupt request signal 220 to the CPU 201. The input/output signals are, for example, input and output through the programmable input/output ports IO0 to IO15.

The timer circuit 210 has the functionality of generating an interrupt request signal 220 to the CPU 201 at time intervals as preset. The setting of the timer circuit 210 such as the time interval is performed by the CPU 201 through the first bus 218.

The ADC 208 converts an analog input signal into a digital signal. The digital signal is read by the CPU 201 via the first bus 218. Moreover, the ADC 208 has the functionality of generating an interrupt request signal 220 to the CPU 201.

The PLL circuit 214 generates a high frequency clock signal by multiplication of the sinusoidal signal as obtained from a quartz oscillator 216.

The clock driver 213 amplifies the high frequency clock signal as received from the PLL circuit 214 to sufficient signal level to provide the clock signal 225 to each function block.

The low voltage detector circuit 215 monitors the power voltage "Vcc" of a system, and issues the reset signal 226 of the PLL circuit 214 and the reset signal 227 of entire system when the power voltage falls below a certain voltage. In addition, in the case where the inner memory 207 comprises an SRAM and needs to maintain data by the power supply from the battery 217, the low voltage detector 215 has the functionality of issuing a battery back-up control signal 224 when the power voltage "Vcc" falls below the certain voltage.

The external memory interface circuit 212 has the functionality of connecting the second bus 219 to the bus 185 and issuing a bus cycle completion signal 228 of the second bus 219 to control the length of the bus cycle of the second bus. Meanwhile, the bus 185 includes the address bus 159 and the data bus 161 of FIG. 10.

The DRAM refresh cycle control circuit 211 periodically and unconditionally gets the ownership of the first bus 218 to perform the refresh cycle of the DRAM at certain intervals.

Needless to say, the DRAM refresh cycle control circuit 211 is provided in case where the inner memory 207 includes a DRAM.

Figure 12:
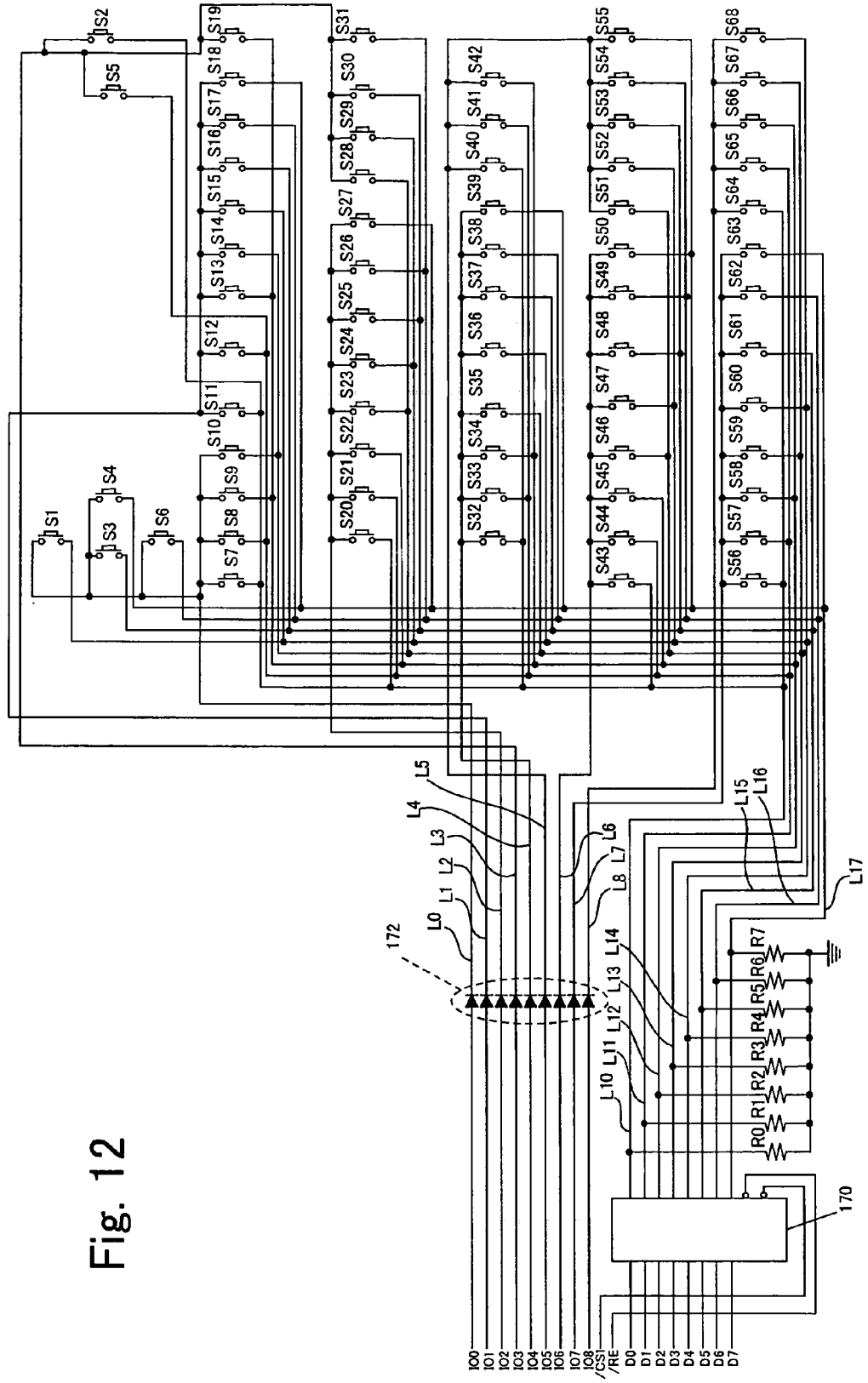
FIG. 12 is a circuit diagram showing a key matrix 155 of FIG. 10.

FIG. 12 is a circuit diagram showing the key matrix 155 of FIG. 10. As illustrated in FIG. 12, the lines L0 to L8 are connected respectively to the input/output ports IO0 to IO8 of the processor 200 through diodes 172 serving to prevent electric current from passing between the output lines. Lines L10 to L17 is connected to respective input ports of a tristate buffer 170, and pull down by respective resistance elements R0 to R7. The output ports of the tristate buffer 170 are connected to the data bus 161.

The chip select signal/CS1 and the read enable signal/RE from the processor 200 are given to the tristate buffer 170. When the chip select signal/CS1 is deactivated, each line L10 to L17 assumes a high impedance state by the tristate buffer 170. When both the chip select signal/CS1 and the read enable signal/RE are activated, signals of the lines L10 to L17 are output to the data bus 161 through the tristate buffer 170.

Keys S1 to S68 are corresponding to the sixty eight keys 3, 7, 9 and 11 of illustrated in FIG. 2. Incidentally, the selection cursor controller 7 consists of four direction keys. In following description, the term "key S" is generally used to represent the keys S1 to S68. The one contact of each key S (output side of the processor 200) is connected to respective lines L0 to L8. The other contact of each key S (input side of the processor 200) is connected to the respective lines L10 to L17. Incidentally, each line L0 to L8 is indicated as an input line and each line L10 to L17 is indicated as an output line.

The processor 200 sets one of the input lines L0 to L8 to high level in order by controlling the input/output ports IO0 to IO8. When the key S which one contact is connected to the input line which is currently set to high level is pressed, the output line which is connected to the other contact of the pressed key S and corresponding to the input line which is currently set to high level becomes high level. The processor 200 obtains potential information of the output lines L10 to L17 through the tristate buffer 170, and judges whether or not the key S is turned on.

Figure 13:
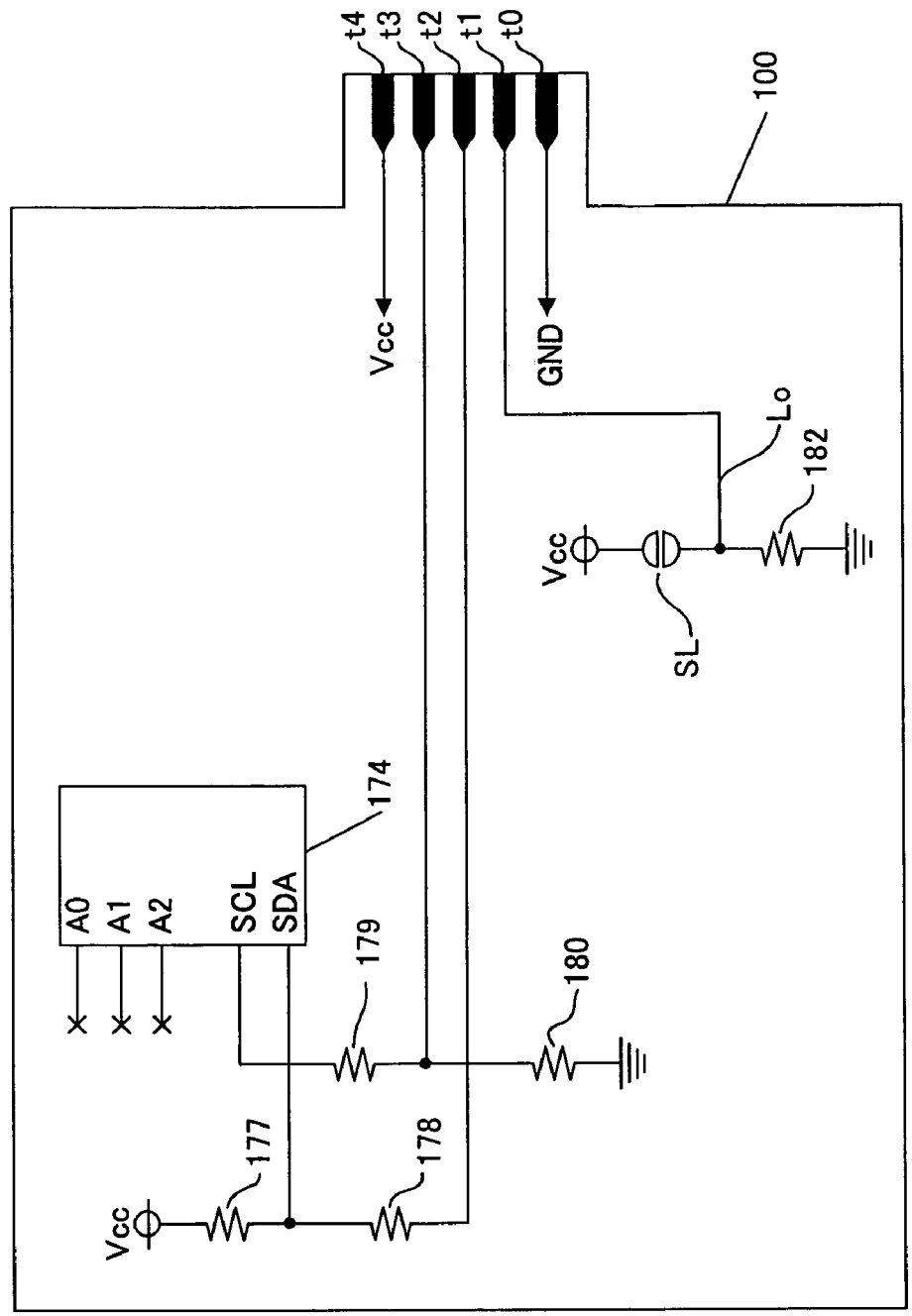
FIG. 13 is a circuit diagram of the memory cartridge ID0 of FIG. 4A.

FIG. 13 is a circuit diagram of the memory cartridge ID0 of FIG. 4A. As illustrated in FIG. 13, the EEPROM 174, resistance elements 177 to 182, a short land SL and terminals t0 to t4 are mounted on the substrate 100. When the memory cartridge ID0 is inserted to the mail exchange apparatus 1, the terminal t0 to t4 are connected to terminals T0 to T4 of the socket 17 of FIG. 10. In this way, the power voltage "Vcc" and "GND" is provided to the EEPROM 174 from the mail exchange apparatus 1.

The terminal t3 is connected to a clock input terminal SCL of the EEPROM 174 through the resistance element 179. Since the terminal t3 is connected to the terminal T3 of FIG. 10, the EEPROM 174 is provided with a clock signal from the input/output port IO13 of the processor 200. The terminal t2 is connected to an input/output terminal SDA of the EEPROM 174 through the resistance element 178.

The terminal t2 is connected to the terminal T2 of FIG. 10. Therefore, the processor 200 can output data through the input/output port IO12 to the EEPROM 174 and the EEPROM 174 can output data to the input/output port IO12. Terminals A0 to A2 of the EEPROM 174 are in a high impedance state. Accordingly, the device address for this EEPROM 174 is decided.

The terminal t1 is connected to the line Lo. The line Lo is pulled down by the resistance element 182, and fixed in the low level. Therefore, a low level signal is constantly input to the input/output port IO11 of the processor 200 through the terminal t1 and T1. The low level signal, i.e. "0", is the identification data of the memory cartridge ID0. Incidentally, the short land SL is not short-circuited.

The circuit configuration of the memory cartridge ID1 is similar to the one of the memory cartridge ID0. However, the short land SL is short-circuited. Accordingly, a high level signal is constantly input to the input/output port IO11 of the processor 200 through the terminal t1 and T1. The high level signal, i.e. "1", is the identification data of the memory cartridge ID1.

Figure 14:
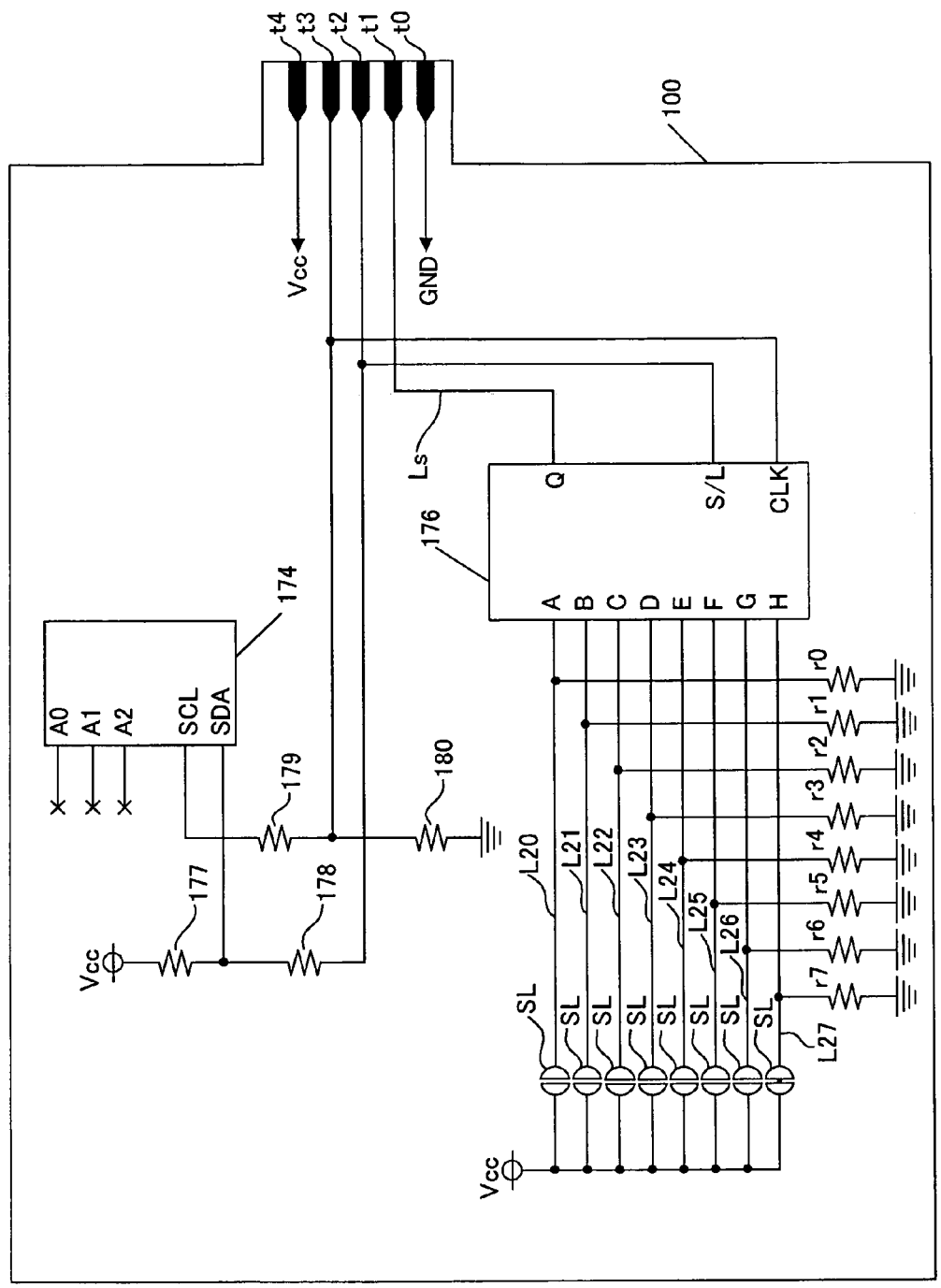
FIG. 14 is a circuit diagram of the memory cartridge ID2 of FIG. 4A.

FIG. 14 is a circuit diagram of the memory cartridge ID2 of FIG. 4A. As illustrated in FIG. 13, an EEPROM 174, a shift register 176, resistance elements 177 to 180 and r0 to r7, a short land SL and terminals t0 to t4 are mounted on the substrate 100. When the memory cartridge ID2 is inserted to the mail exchange apparatus 1, the terminals t0 to t4 are connected to terminals T0 to T4 of the socket 17 of FIG. 10. In this way, the power voltage "Vcc" and "GND" is provided to the EEPROM 174 from the mail exchange apparatus 1.

The terminal t3 is connected to a clock input terminal SCL of the EEPROM 174 through the resistance element 179, and also connected to a clock input terminal CLK of the shift register 176. Since the terminal t3 is connected to the terminal T3 of FIG. 10, the shift register 176 and the EEPROM 174 are provided with a clock signal through the input/output port IO13 of the processor 200.

The terminal t2 is connected to the input/output terminal SDA of the EEPROM 174 through the resistance element 178, and also connected to a terminal S/L of the shift register 176. Since the terminal t2 is connected to the terminal T2 of FIG. 10, it is possible to output data from processor 200 to the EEPROM 174 through the input/output port IO12, and also output data from the EEPROM 174 to processor 200 through the input/output port IO12. In addition, it is possible to give a S/L control signal from processor 200 to the terminal S/L of the shift register 176 through the input/output port IO12. The shift register 176 reads data in parallel input terminals "A" to "H" when the S/L control signal is low level while outputting a serial signal through a serial output terminal Q when the control S/L signal is high level.

Each terminal "A" to "H" of the shift register 176 is connected to respective lines L20 to 27. The lines L20 to L27 are pulled down by the resistance element r0 to r7. However, since the short land SL which is connected to the line 27 is short-circuited, only the line 27 is high level while the other is low level. Accordingly, a serial signal "00000001" is output to a line Ls through the terminal "Q". The serial signal "00000001" as output to the line Ls is the identification data of the memory cartridge ID2.

Since the terminal t1 which the line Ls is connected to is connected to the terminal T1 of FIG. 10, the identification data "00000001" is input to the input/output port IO11 of the processor. Namely, the identification data can be provided in terms of a combination of short-circuited and unshort-circuited ones of the eight short lands SL. However, it is not possible to short-circuit all short lands and unshort-circuit all short lands. This is because the identification data of the memory cartridge ID0 is "0" and the identification data of the memory cartridge ID1 is "1" as explained above.

Figures 15, 16:
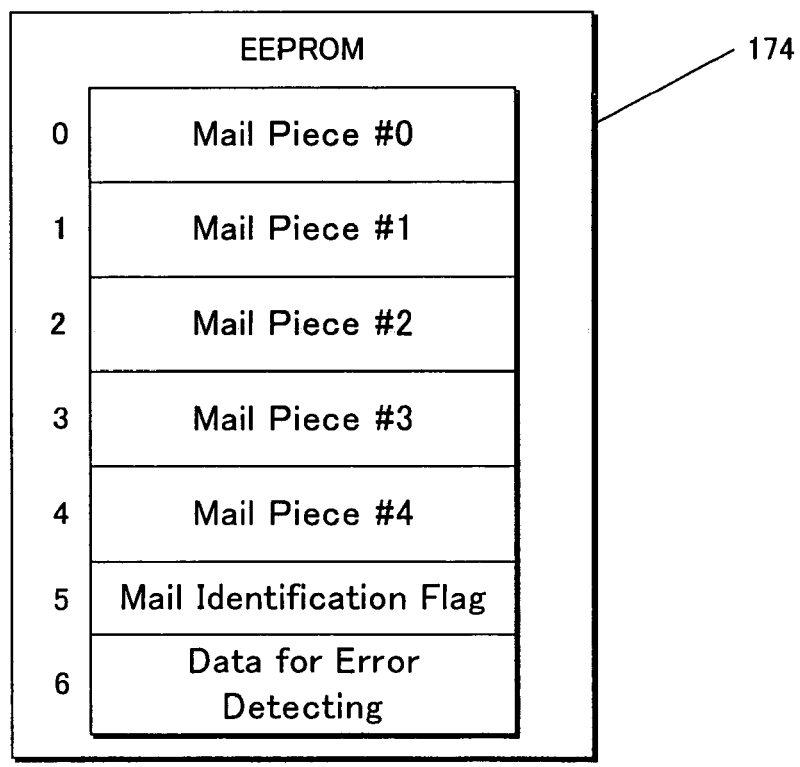
FIG. 15 is a view showing the relation between the memory cartridges ID0 to ID7 and identification data.
FIG. 16 is a schematic representation of data stored in a EEPROM of each memory cartridge ID0 to ID7.

The circuit configuration of each memory cartridge ID3 to ID7 is similar to the one of the memory cartridge ID2. However, the sort land SL to be short-circuited is different. FIG. 15 is a view showing the relation between the memory cartridges ID2 to ID7 and the identification data. As illustrated in FIG. 15, for example, only the short land SL which is connected to the line L25 is short-circuited, and only the terminal "F" of the shift register 176 becomes "1" i.e. high level in the memory cartridge ID4.

FIG. 16 is a schematic representation of data stored in the EEPROM 174 of each memory cartridge ID0 to ID7. As illustrated in FIG. 16, the mail pieces #0 to #4 are stored in zeroth block to fourth block, a mail identification flag is stored in fifth block, and data for detecting error is stored in sixth block of the EEPROM 174.

The mail identification flag is a flag for indicating the state (opened, unopened or unused) of each mail piece #0 to #4. The data for detecting error is, for example, an additional value of all data stored in zeroth block to fifth block, and written lastly.

Figure 17:
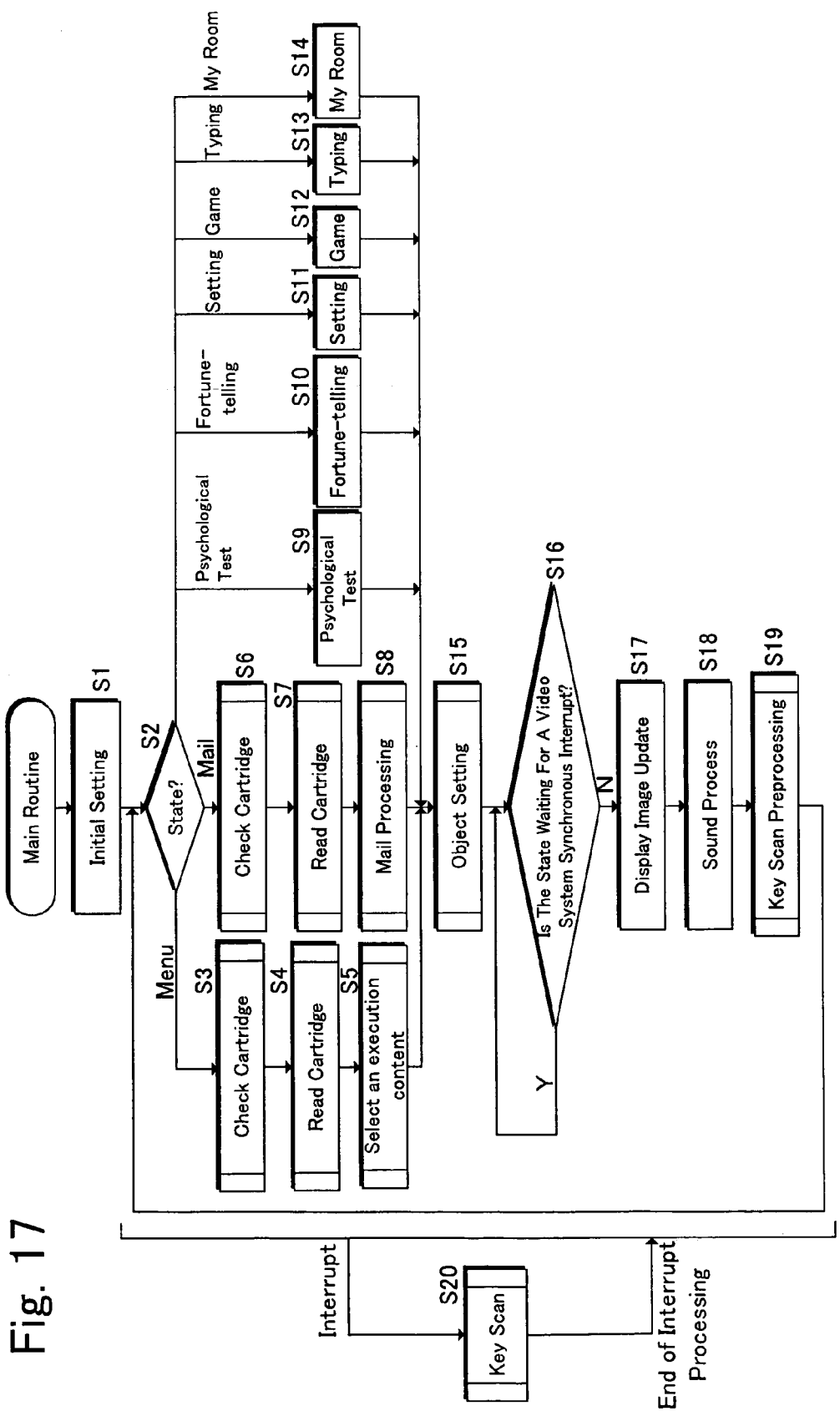
FIG. 17 is a flowchart showing the entire operation of the mail exchange apparatus 1.

Next, the process flow of the mail exchange apparatus 1 of FIG. 1 will be explained. FIG. 17 is a flowchart showing the entire operation of the mail exchange apparatus 1. As illustrated in FIG. 17, the CPU 201 performs the initial setting of the system in step S1. Incidentally, the process for setting the timer circuit 210 as a source of generating an interrupt request signal is performed in this initial setting. In step S2, the CPU 201 judges a state.

If the state is the menu displaying state, the CPU 201 proceeds to step S3. If the state is the mail processing state, the CPU 201 proceeds to step S6. If the state is the psychological testing state, the CPU 201 proceeds to step S9. If the state is the fortune-telling processing state, the CPU 201 proceeds to step S10. If the state is the setting processing state, the CPU 201 proceeds to step S11. If the state is the game processing state, the CPU 201 proceeds to step S12. If the state is the typing processing state, the CPU 201 proceeds to step S13. If the state is the my room processing state, the CPU 201 proceeds to step S14.

The state right after the power switch 13 is turned on is the menu displaying state. Therefore, the process of step S3 is firstly performed. In step S3, the CPU 201 checks whether or not any of the memory cartridges ID0 to ID7 is inserted to the mail exchange apparatus 1. In step S4, the CPU 201 reads mail data from the inserted memory cartridge. In step S5, the CPU 201 performs content selecting process (refer to FIG. 5).

The processes in step S6 and step S7 are similar to the processes in step S3 and step S4. In step S8, the CPU 201 performs the mail processing (refer to FIG. 6 to FIG. 9).

In step S15, the CPU 201 stores object-related information to display objects in the inner memory 207. Each object consists of single or several sprite(s).

In step S16, the CPU 201 determines whether or not the CPU 201 waits for the video system synchronous interrupt. The display screen of the television monitor 500 is updated in the vertical blanking period. Accordingly, after the process necessary for updating the display screen is completed, the CPU 201 refrains from proceeding its operation until the next video system synchronous interrupt is issued. Namely, while the CPU 201 waits for the video system synchronous interrupt in step S16 (i.e., as long as the video system synchronous interrupt does not issue), the process repeats the same step S16. On the other hand, if the CPU 201 gets out of the state of waiting for the video system synchronous interrupt in step S16 (i.e., if the CPU 201 is given the video system synchronous interrupt), the process proceeds to the step S17.

In step S17, the CPU 201 transmits the object related information to the graphic processor 202, and the graphics processor 202 acquires background related information from the inner memory 207. The graphic processor 202 generates the video signal VD containing objects and background on the basis of those information, and outputs it to the television monitor 500.

Incidentally, the object related information includes size information, depth value, color palette information, storage location information of pixel pattern data, horizontal coordinate information and vertical coordinate information of a sprite(s) constituting an object to be displayed. The pixel pattern data designates color of each pixel constituting a sprite. The color palette information designates a color palette. The graphic processor 202 has a plurality of color palettes each of which consists of certain number of color information items. Accordingly, the graphic processor 202 acquires the color information designated by the pixel pattern data from the color palette indicated by the color palette information. The depth value indicates the depth position of the pixels, and if a plurality of pixels overlap each other only the pixel having the largest depth value is displayed.

The background related information includes storage location information of pixel pattern data, depth value and color palette information of each character constituting the background screen.

In step S18, the CPU 201 stores sound related information in the inner memory 207. The sound processor 203 obtains the sound related information from the inner memory 207 and generates the audio signals AL and AR on the basis of the information, and then gives them to the television monitor 500.

In step S19, the CPU 201 activates the timer circuit 210 for preprocessing of the key scan. In step S20, the key scan processing is performed if the timer circuit 210 issues the interrupt request signal. The interrupt responsive to the video system synchronous signal is, for example, issued every 1/60 second (about 17 ms). In this case, the timer circuit 210 issues the interrupt request signal every 1.5 ms. Accordingly, since the output to the key matrix 155 is nine bits (refer to FIG. 10), all scan is completed within about 14 ms (9×1.5 ms). Namely, the key scan is completed within a period of displaying one frame.

Figure 18:
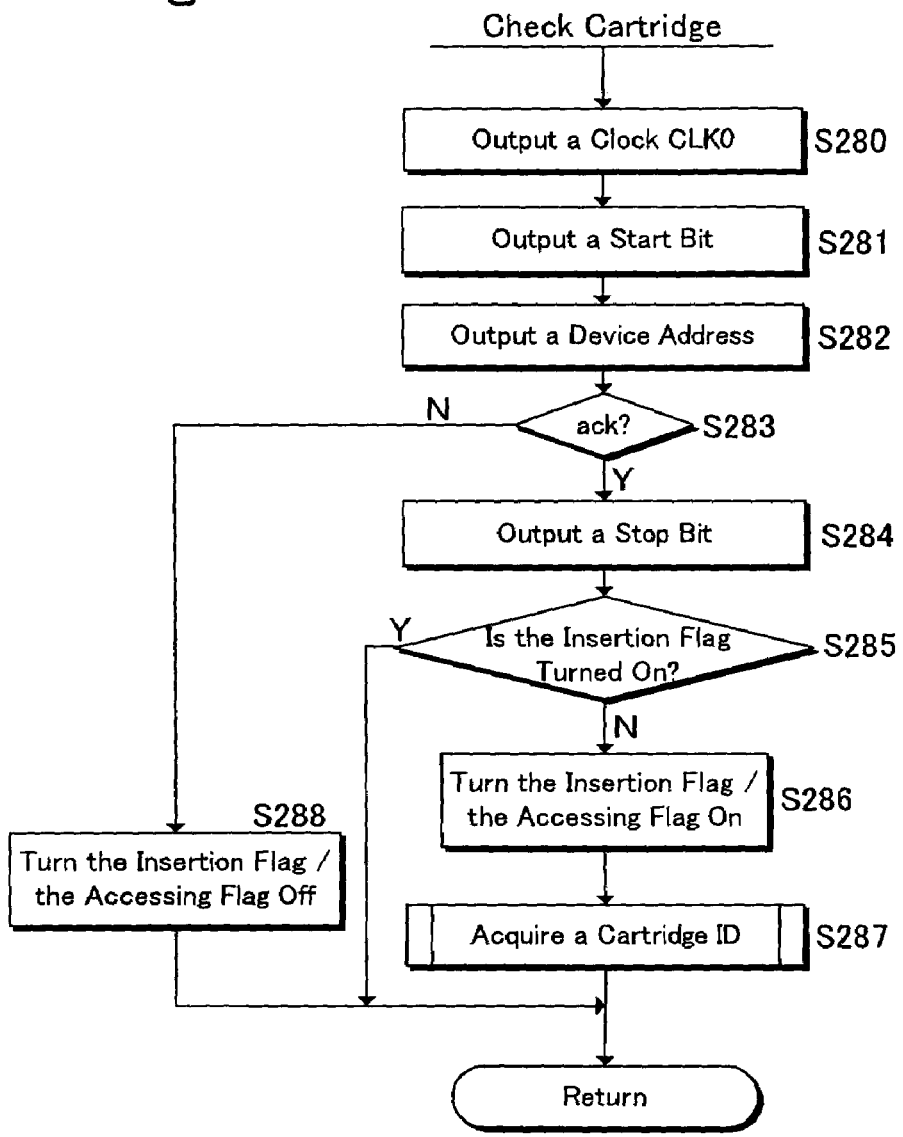
FIG. 18 is a flowchart showing the process flow of the cartridge check in step S3 of FIG. 17.

FIG. 18 is a flowchart showing the process flow of the cartridge check in step S3 of FIG. 17. In step S280, the CPU 201 outputs the clock signal CLK0 to the EEPROM 174 through the input/output port IO13. In step S281, the CPU 201 outputs a start bit to the EEPROM 174 through the input/output port IO12. In step S282, the CPU 201 outputs the device address to the EEPROM 174 through the input/output port IO12. Device type recognition, page selection and read/write operation designation are performed in accordance with the device address.

In step S283, the CPU 201 performs detecting process of an "ack" signal from the EEPROM 174. If the "ack" signal is detected, the CPU 201 proceeds to step S284, otherwise proceeds to step S288 to turn an insertion flag and an accessing flag off. The insertion flag is turned on when one of the memory cartridges ID0 to ID7 is inserted to the mail exchange apparatus 1. Incidentally, if the "ack" signal is sent from the EEPROM 174, it means that one of the memory cartridges ID0 to ID7 is inserted. The accessing flag is turned on when the CPU 201 is accessing the EEPROM 174 of the inserted memory cartridge.

In step S284, the CPU 201 outputs a stop bit to the EEPROM 174 through the input/output port IO12. In step S285, the CPU 201 judges whether or not the insertion flag is turned on. If it is turned on, the CPU 201 returns to the main routine, otherwise proceeds to step S286. In step S286, the CPU 201 turns the insertion flag and accessing flag on. In step S287, the CPU 201 acquires the identification data (ID) of the inserted memory cartridge.

Figure 19:
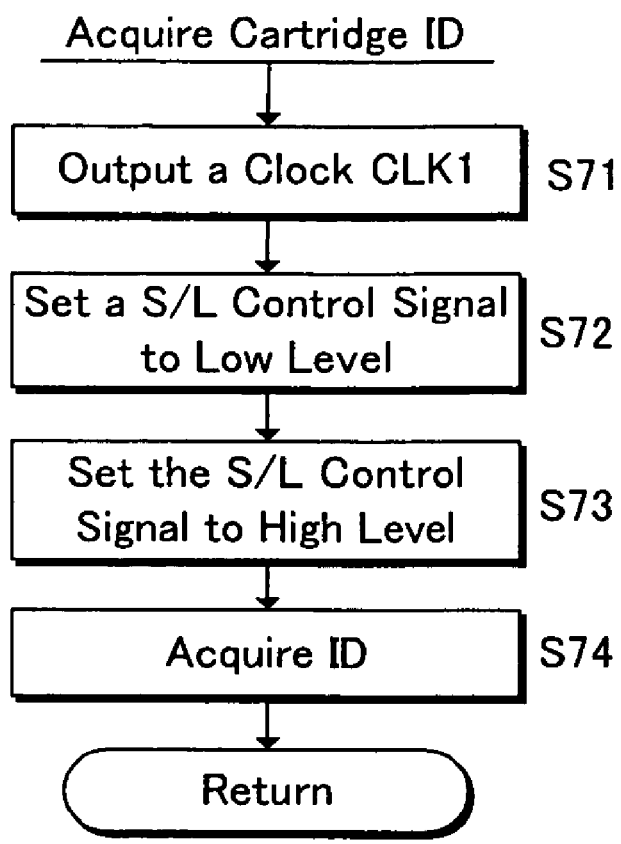
FIG. 19 is a flowchart showing the process flow of acquiring a cartridge ID in step S287 of FIG. 18.

FIG. 19 is a flowchart showing the process flow of acquiring the cartridge ID in step S287 of FIG. 18. As illustrated in FIG. 19, the CPU 201 outputs the clock signal CLK1 to the shift register 176 through the input/output port IO13 in step S71. Incidentally, it is preferred that the frequency of the clock signal CLK1 is set to be lower than the one of the clock signal CLK0.

In step S72, the CPU 201 sets a value of the input/output port IO12 to low level, and gives the low level S/L control signal to the shift register 176. In this way, the identification data of the inserted memory cartridge is read in the shift register 176. In step S73, the CPU 201 sets a value of the input/output port IO12 to high level, and gives the high level S/L control signal to the shift register 176. In this way, the shift register 176 serial-outputs the identification data. In step S74, the CPU 201 acquires the identification data through the input/output port IO11. When the memory cartridge ID0 or ID1 is inserted to the mail exchange apparatus 1, the input/output port IO11 is constantly given a low level signal or a high level signal.

Figure 20:
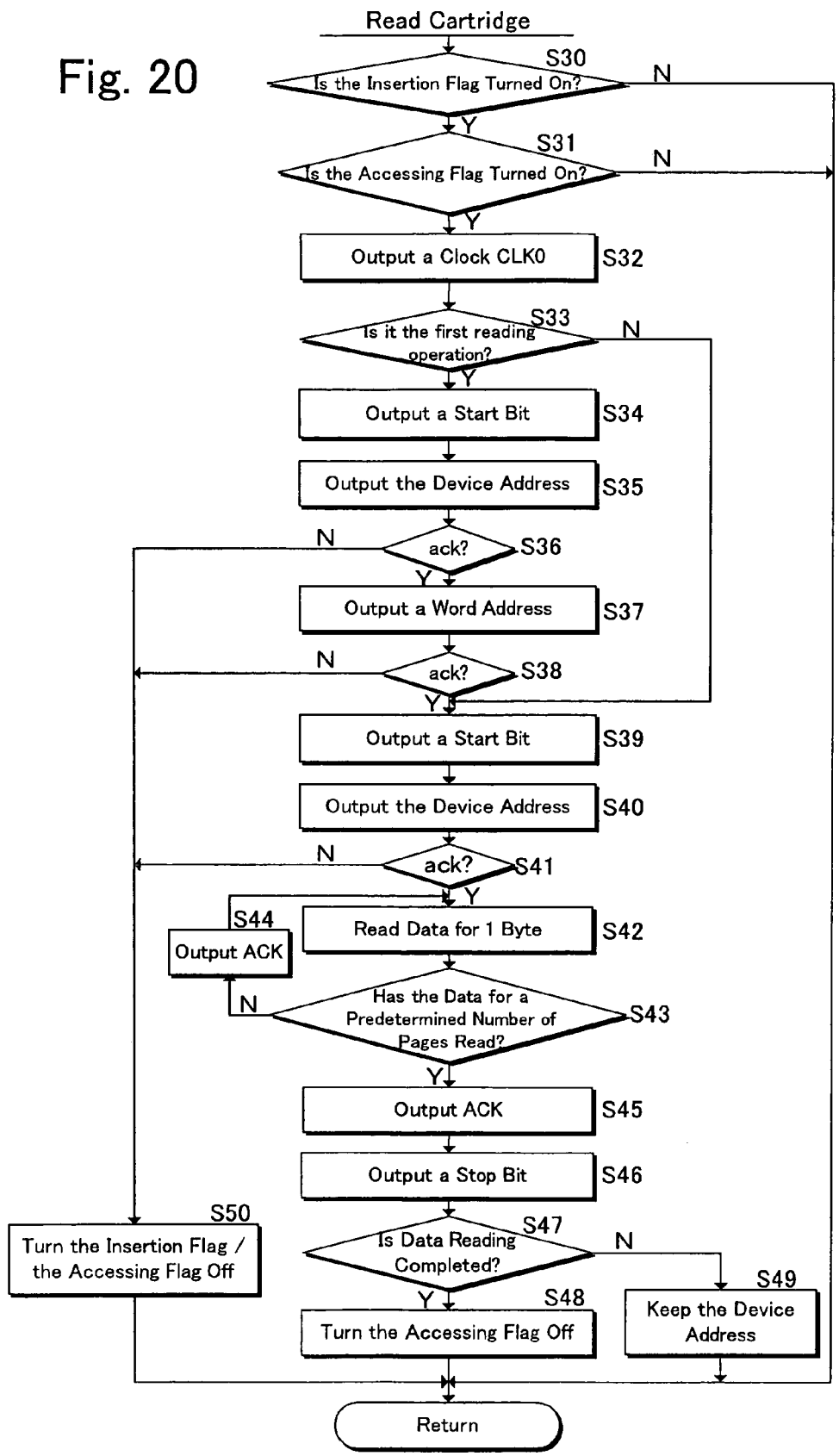
FIG. 20 is a flowchart showing the process flow of reading cartridge information in step S4 of FIG. 17.

FIG. 20 is a flowchart showing the process flow of reading the cartridge information in step S4 of FIG. 17. In step S30, the CPU 201 judges whether or not the insertion flag is turned on. If it is turned on, the CPU 201 proceeds to step S31, otherwise returns to the main routine. In step S31, the CPU 201 judges whether or not the accessing flag is turned on. If it is turned on, the CPU 201 proceeds to step S32, otherwise returns to the main routine. In step S32, the CPU 201 outputs the clock signal CLK0 to the EEPROM 174 through the input/output port IO13.

In step S33, the CPU 201 judges whether or not it is the first reading operation, and if it is the first the process proceeds to step S34 otherwise proceeds to step S39. In step S34, the CPU 201 outputs a start bit to the EEPROM 174 through the input/output port IO12. In step S35, the CPU 201 outputs the device address to the EEPROM 174 through the input/output port IO12.

In step S36, the CPU 201 performs detecting process of an "ack" signal from the EEPROM 174. If the "ack" signal is detected, the CPU 201 proceeds to step S37, otherwise proceeds to step S50. In step S37, the CPU 201 outputs a word address to the EEPROM 174 through the input/output port IO12. In step S38, the CPU 201 performs detecting process of an "ack" signal from the EEPROM 174. If the "ack" signal is detected, the CPU 201 proceeds to step S39, otherwise proceeds to step S50.

In step S39, the CPU 201 outputs a start bit to the EEPROM 174 through the input/output port IO12. In step S40, the CPU 201 outputs the device address to the EEPROM 174 through the input/output port IO12. In step S41, the CPU 201 performs detecting process of an "ack" signal from the EEPROM 174. If the "ack" signal is detected, the CPU 201 proceeds to step S42, otherwise proceeds to step S50. In step S50, the CPU 201 turns the insertion flag and the accessing flag off and returns to the main routine.

In step S42, the CPU 201 reads data for one byte from the EEPROM 174 through the input/output data IO12. In step S43, the CPU 201 judges whether or not the data for a predetermined number of pages has been read, and if the data has not been read yet the CPU 201 proceeds to step S44, outputs the ACK signal to the EEPROM 174 through the input/output port IO12, and continues at step S42. On the other hand, if the data for the predetermined number of pages has already been read, the CPU 201 proceeds to step S45 to output the "ACK" signal to the EEPROM 174 through the input/output port IO12 and proceeds to step S46.

In step S46, the CPU 201 outputs a stop bit to the EEPROM 174 through the input/output port IO12. In step S47, the CPU 201 judges whether or not the reading operation has finished for all data. If finished, the CPU 201 proceeds to step S48, otherwise proceeds to step S49.

In step S48, the CPU 201 turns the accessing flag off and returns to the main routine. In step S49, the CPU 201 keeps the current device address and returns to the main routine.

Figure 21:
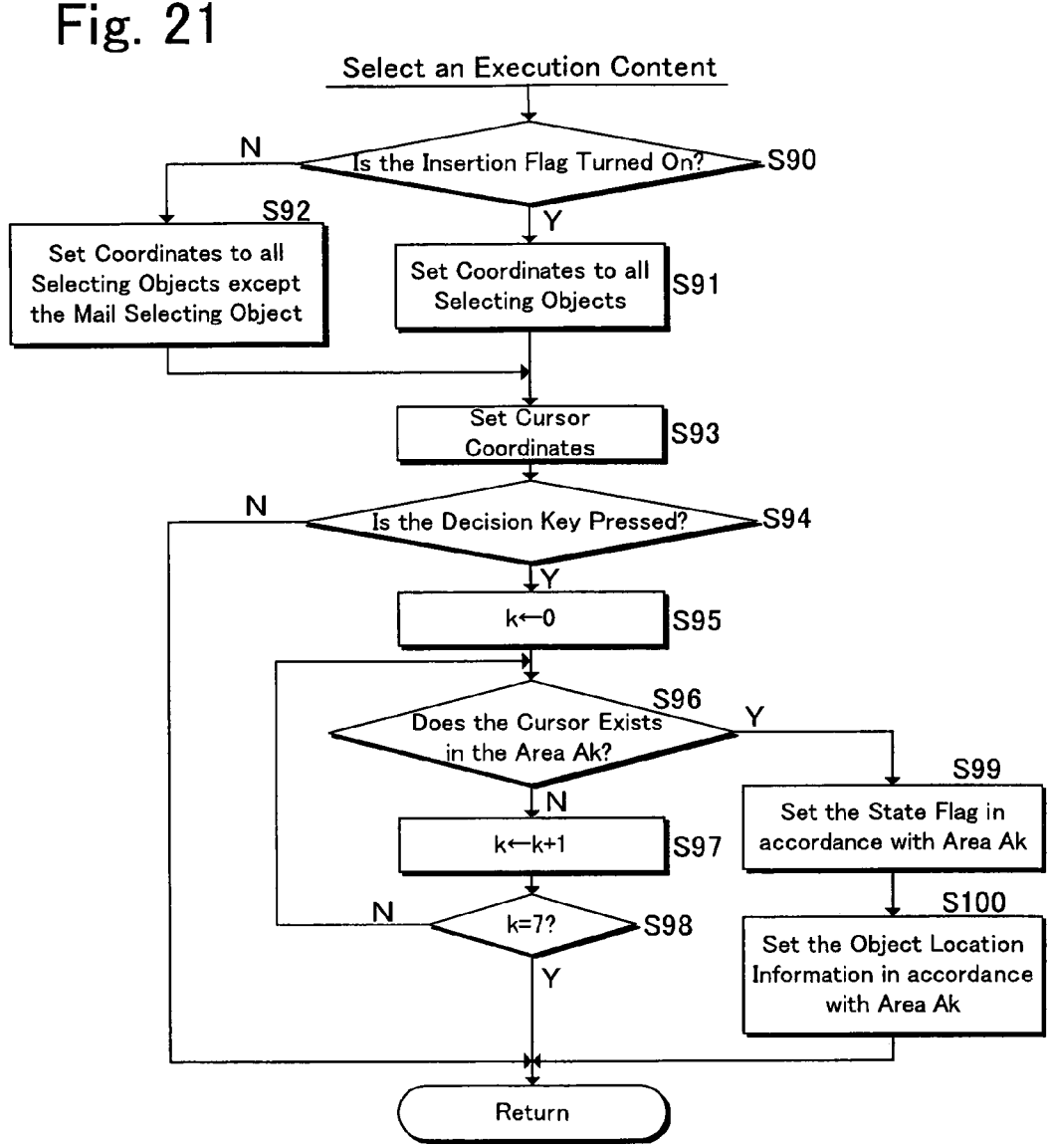
FIG. 21 is a flowchart showing the process flow of execution content selection in step S5 of FIG. 17.

FIG. 21 is a flowchart showing the process flow of the execution content selection in step S5 of FIG. 17. As illustrated in FIG. 21, the CPU 201 judges whether or not the insertion flag is turned on. If it is turned on, the CPU 201 proceeds to step S91, otherwise proceeds to step S92. In step S92, the CPU 201 sets coordinates of the selecting objects 123, 125, 127, 129, 131 and 133 except the mail selecting object 121 (i.e., stores in the inner memory 207). On the other hand, the CPU 201 sets coordinates of all selecting objects 121, 123, 125, 127, 129, 131 and 133 (i.e., stores in the inner memory 207).

In step S93, the CPU 201 sets coordinates of the selection cursor 119 in responsive to the input from the selection cursor controller 7 (i.e., stores in the inner memory 207). In step S94, the CPU 201 judges whether or not the decision key 9 is pressed. If it is not pressed, the CPU 201 returns to the main routine, otherwise proceeds to step S95. In step S95, the CPU 201 sets "0" to a counter "k".

In step S96, the CPU 201 judges whether or not the selection cursor 119 exists in an area "Ak". If it exists in the area "Ak", the CPU 201 proceeds to step S99, otherwise proceeds to step S97. However, in case where the insertion flag is turned off, the process proceeds to step S97 even though the selection cursor 119 exists the area A0 corresponding to the mail selecting object 121. In step S97, the CPU 201 increments the counter "k". In step S98, the CPU 201 judges whether or not the counter "k" is "7". Is it is "7", the CPU 201 returns to the main routine, otherwise proceeds to step S96.

In step S99, the CPU 201 sets a state flag in accordance with the area "Ak". In step S100, the CPU 201 sets location information (horizontal and vertical coordinates) of objects (constituting an image corresponding to the state) to be displayed in accordance with the area "Ak", and returns to the main routine.

Incidentally, the area A0 is corresponding to the display area of the mail selecting object 121. The area A1 is corresponding to the display area of the psychological test selecting object 125. The area A2 is corresponding to the display area of the fortune-telling selecting object 125. The area A3 is corresponding to the display area of the setting selecting object 127. The area A4 is corresponding to the display area of the game selecting object 129. The area A5 is corresponding to the display area of the typing selecting object 131. The area A6 is corresponding to the display area of the my room selecting object 133.

Figure 22:
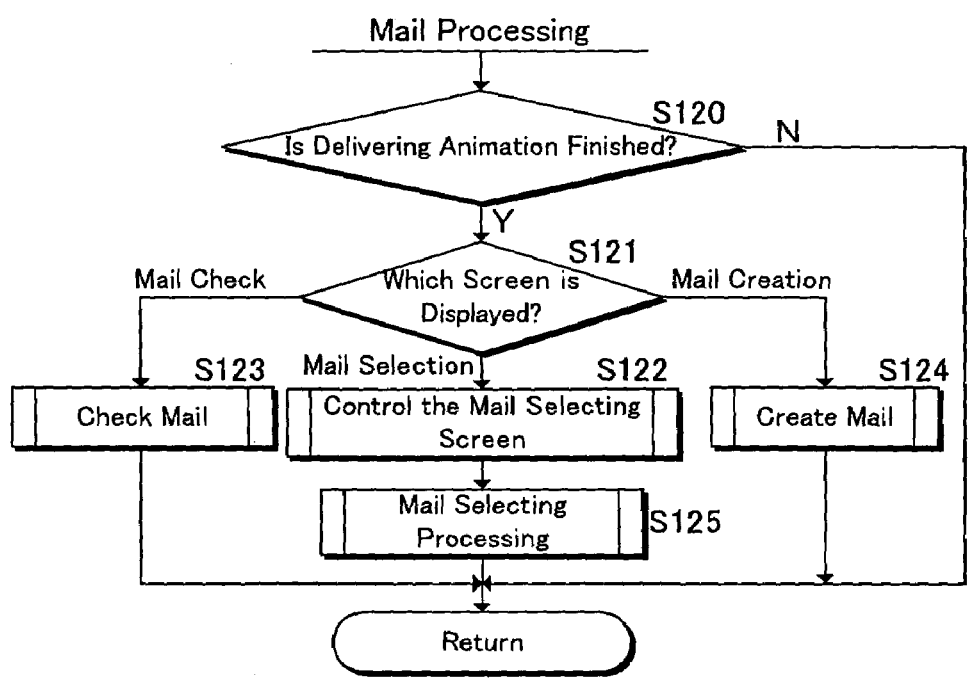
FIG. 22 is a flowchart showing the process flow of mail processing in step S8 of FIG. 17.

FIG. 22 is a flowchart showing the process flow of the mail processing in step S8 of FIG. 17. As illustrated in FIG. 22, the CPU 201 judges whether or not the mail delivering animation (refer to FIG. 6) has finished in step S120. If it has finished, the CPU 201 proceeds to step S121, otherwise returns to the main routine. In step S121, the CPU 201 determines a kind of display screens. If the display screen is the read/delete selection screen, the CPU 201 proceeds to step S123 (refer to FIG. 9). If the display screen is the mail selecting screen, the CPU 201 proceeds to step S122 (refer to FIG. 7). If the display screen is the mail creation screen, the CPU 201 proceeds to step S124 (refer to FIG. 8).

In step S122, the CPU 201 performs mail selecting screen control processing. In step S125, the CPU 201 performs mail selecting processing. In step S123, the CPU 201 performs mail check processing. In step S124, the CPU 201 performs mail creation processing.

Figure 23:
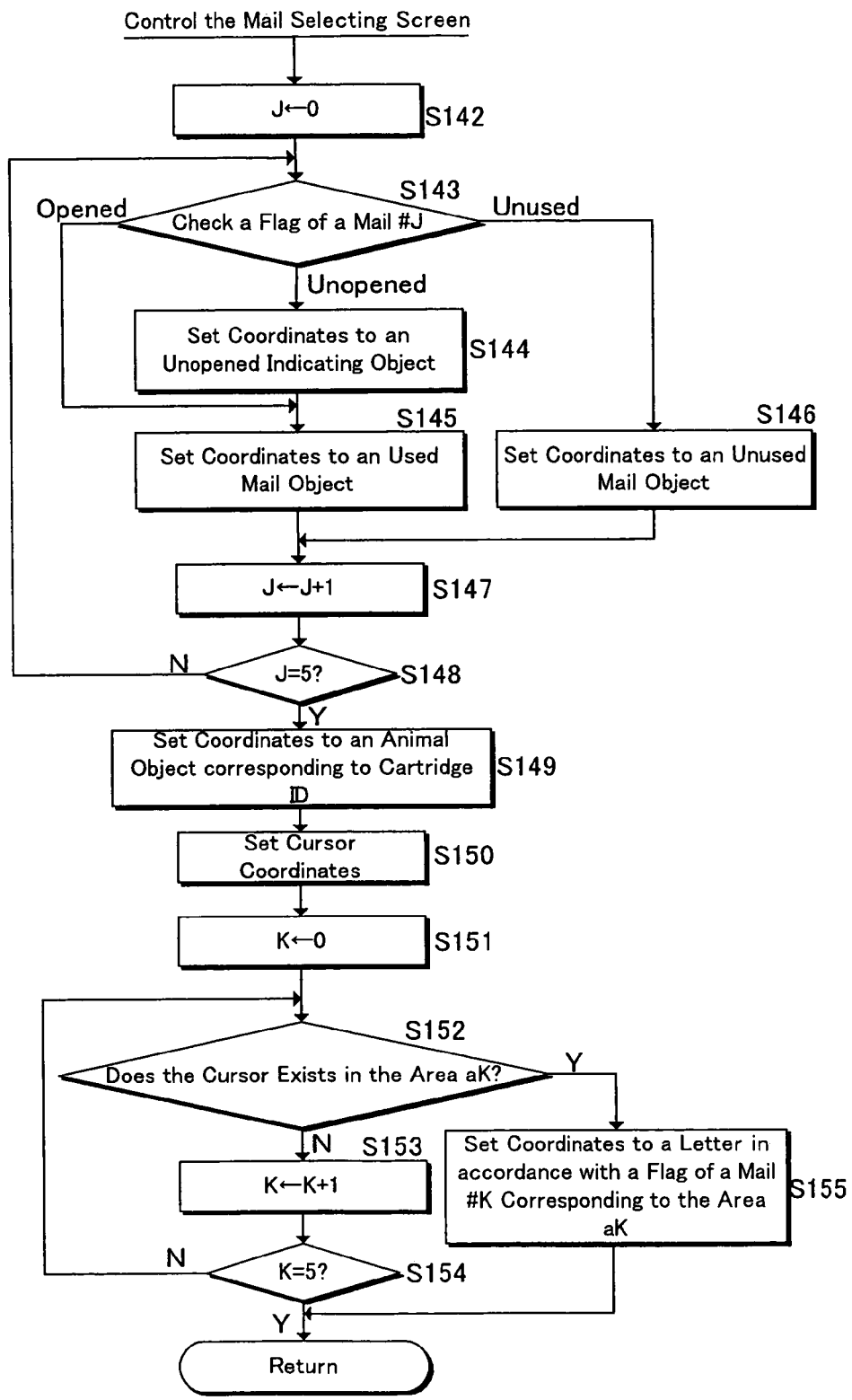
FIG. 23 is a flowchart showing the process flow of the mail selecting screen control processing in step S122 of FIG. 22.

FIG. 23 is a flowchart showing the process flow of the mail selecting screen control processing in step S122 of FIG. 22. As illustrated in FIG. 23, the CPU 201 sets "0" to a counter "J" in step S142.

In step S143, the CPU 201 checks the mail identification flag (refer to FIG. 16) corresponding to the mail piece #J. If the mail piece #J has already been opened, the CPU 201 proceeds to step S145. If the mail piece #J is unopened, the CPU 201 proceeds to step S144. If the mail piece #J is unused, the CPU 201 proceeds to step S146. In step S144, the CPU 201 sets coordinates of the unopened indicating object 145 (i.e., stores in the inner memory 207). In step S145, the CPU 201 sets coordinates of the used mail object 139 (i.e., stores in the inner memory 207). In step S146, the CPU 201 sets coordinates of the unused mail object 141 (i.e., stores in the inner memory 207).

In step S147, the CPU 201 increments the counter "J". In step S148, the CPU 201 determines whether or not the counter "J" is "5". If the counter "J" is "5", the CPU 201 proceeds to step S149, otherwise proceeds to step S143. In step S149, the CPU 201 sets coordinates of the animal object (the animal object c7-2 in FIG. 7) corresponding to the identification data of the inserted memory cartridge (i.e., stores in the inner memory 207). In step S150, the CPU 201 calculates and sets coordinates of the selection cursor 119.

In step S151, the CPU 201 assigns "0" to a counter "K". In step S152, the CPU 201 determines whether or not the selection cursor 119 exists in the area "aK". If it exists in the area "aK", the CPU 201 proceeds to step S155, otherwise proceeds to step S153. In step S153, the CPU 201 increments the counter "K". In step S154, the CPU 201 determines whether or not the counter "K" is "5". If the counter "K" is "5", the CPU 201 proceeds to step S125, otherwise proceeds to step S152. On the other hand, the CPU 201 sets coordinates to letters to be displayed in the guide displaying portion 137 of FIG. 7 in accordance with the mail identification flag (refer to FIG. 16) of the mail piece #K corresponding to the area "aK".

In this case, the area a0 is the area for displaying the mail objects 139 and 141 corresponding to the mail piece #0; the area a1 is the area for displaying the mail objects 139 and 141 corresponding to the mail piece #1; the area a2 is the area for displaying the mail objects 139 and 141 corresponding to the mail piece #2; the area a3 is the area for displaying the mail objects 139 and 141 corresponding to the mail piece #3; and the area a4 is the area for displaying the mail objects 139 and 141 corresponding to the mail piece #4 (refer to FIG. 7).

Figure 24:
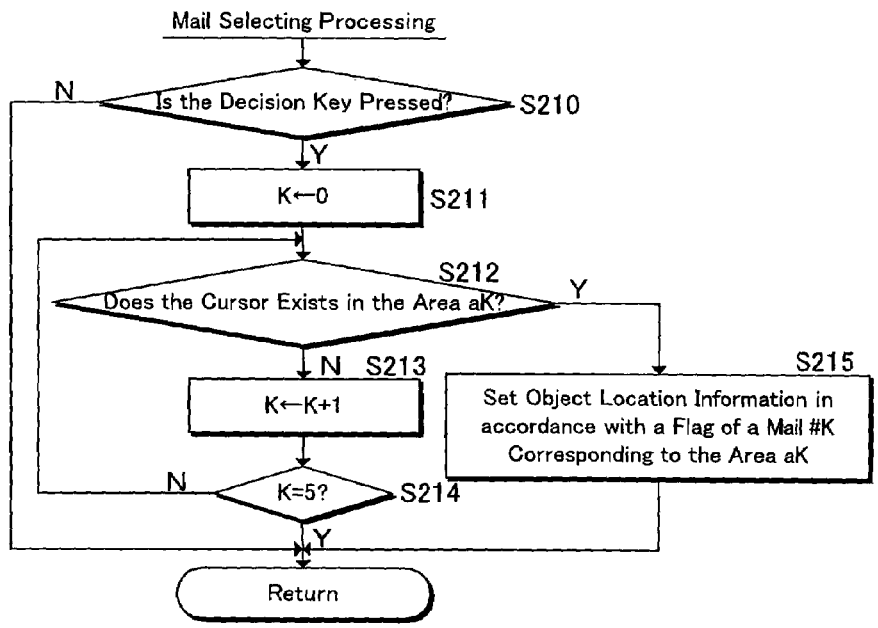
FIG. 24 is a flowchart showing the process flow of selecting a mail in step S125 of FIG. 22.

FIG. 24 is a flowchart showing the process flow of selecting the mail in step S125 of FIG. 22. As illustrated in FIG. 24, the CPU 201 judges if the decision key 9 is pressed in step S210. If the decision key 9 is not pressed, the CPU 201 returns to the main routine, otherwise proceeds to step S211. In step S211, the CPU 201 assigns "0" to a counter "K". In step S212, the CPU 201 judges whether or not the selection cursor 119 exists in the area "aK". If it exists in the area "aK", the CPU 201 proceeds to step S215, otherwise proceeds to step S213. In step S213, the CPU 201 increments the counter "K". In step S214, the CPU 201 determines whether or not the counter "K" is "5". If it is not "5", the CPU 201 proceeds to step S212. On the other hand, the CPU 201 sets location information (horizontal and vertical coordinates) of objects (constituting the mail creation screen or the read/delete selecting screen) to be displayed in accordance with the mail identification flag of the mail piece #K corresponding to the area "aK".

Figure 25:
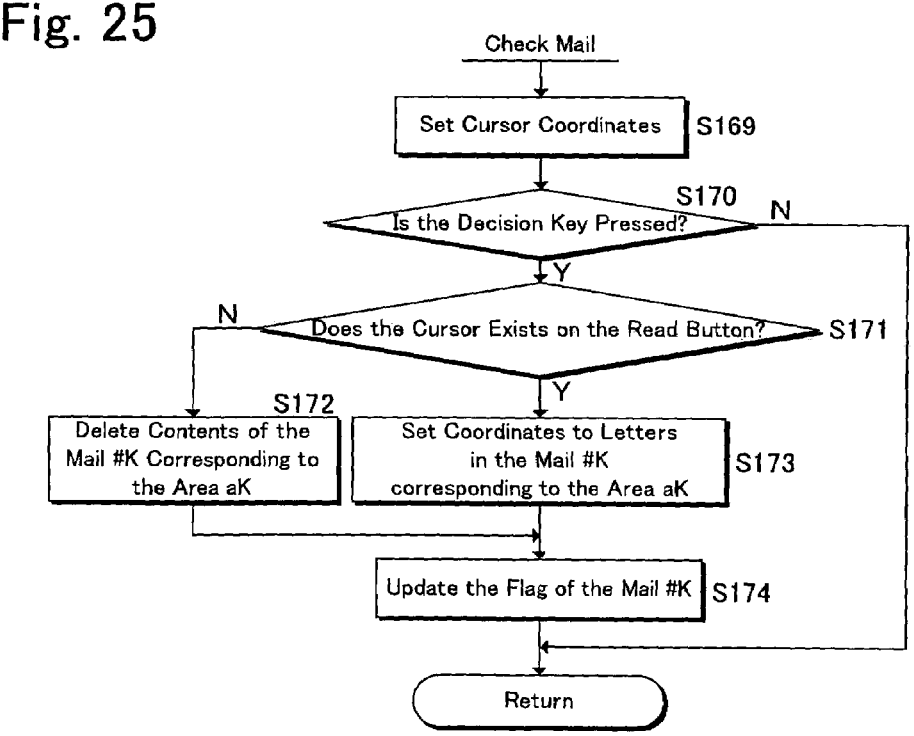
FIG. 25 is a flowchart showing the process flow of checking a mail in step S123 of FIG. 22.

FIG. 25 is a flowchart showing the process flow of checking the mail in step S123 of FIG. 22. As illustrated in FIG. 25, the CPU 201 calculates and sets coordinates of the selection cursor 119 in step S169. In step S170, the CPU 201 determines whether or not the decision key 9 is pressed. If the decision key 9 is not pressed, the CPU 201 returns to the main routine, otherwise proceeds to step S171. In step S171, the CPU 201 judges whether or not the selection cursor 119 exists on the read button 147. If it exists on the read button 147, the CPU 201 proceeds to step S173. If the selection cursor 119 exists on the delete button 149, the CPU 201 proceeds to step S172.

In step S173, the CPU 201 sets coordinates of letters which is contained in the mail piece #K corresponding to the area "aK". On the other hand, in step S172, the CPU 201 deletes the mail piece #K corresponding to the area "aK". In step S174, the CPU 201 updates the identification flag of the mail piece #K.

Figure 26:
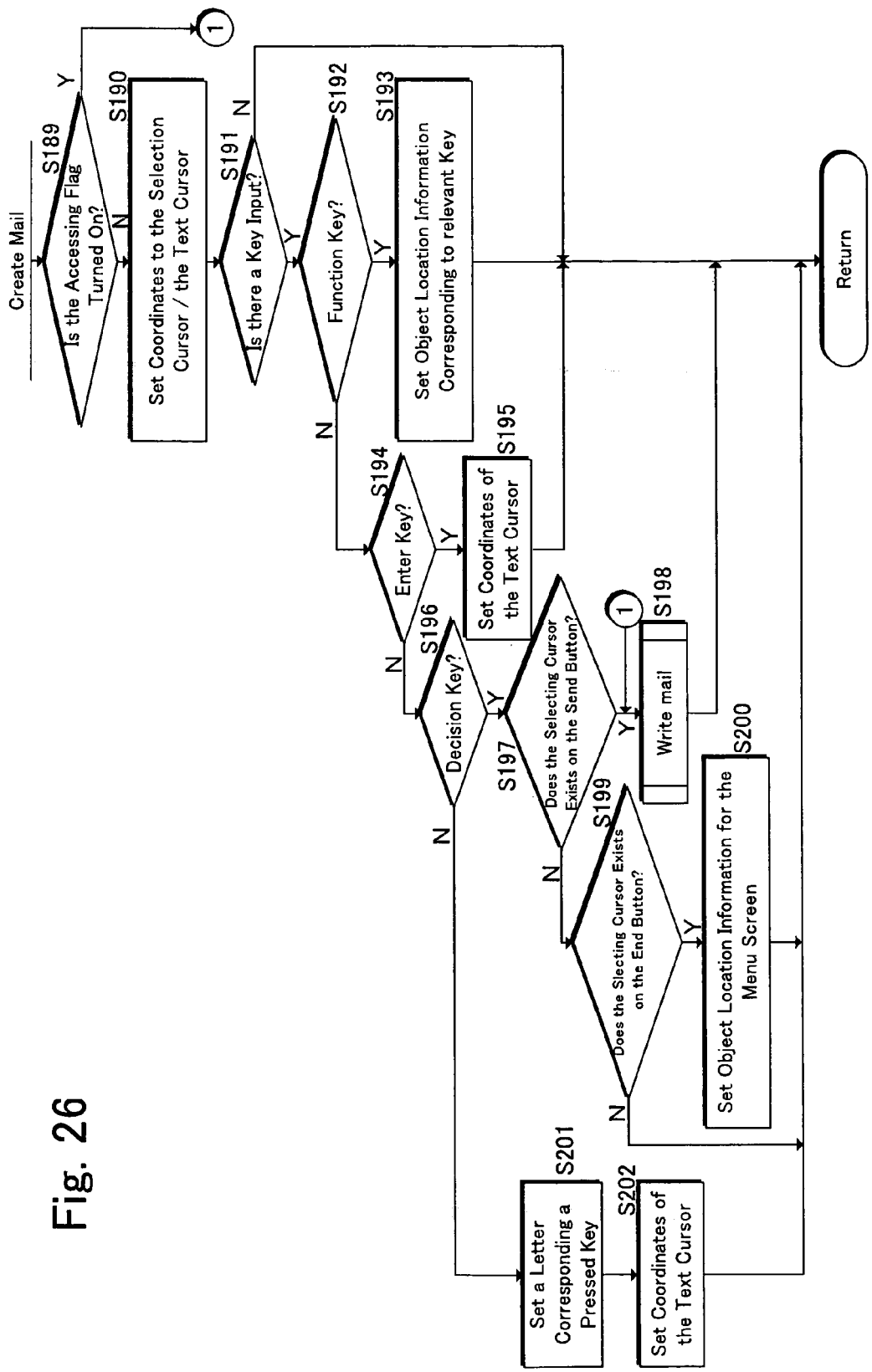
FIG. 26 is a flowchart showing the process flow of creating a mail in step S124 of FIG. 22.

FIG. 26 is a flowchart showing the process flow of creating the mail in step S124 of FIG. 22. As illustrated in FIG. 26, the CPU 201 judges whether or not the accessing flag is turned on in step S189. If it is turned on, the CPU 201 proceeds to step S198, otherwise proceeds to step S190. In step S190, the CPU 201 sets coordinates of the selection cursor 119 and the text cursor 117. In step S191, the CPU 201 judges whether or not there is key-input. If there is the key-input, the CPU 201 proceeds to step S192, otherwise returns to the main routine.

In step S192, the CPU 201 judges whether or not one of the function keys is pressed. If the function key is pressed, the CPU 201 proceeds to step S193, otherwise proceeds to step S194. In step S193, the CPU 201 sets location information (horizontal and vertical coordinates) of objects corresponding to the function key as pressed.

In step S194, the CPU 201 judges whether or not the enter key 43 is pressed. If the enter key 43 is pressed, the CPU 201 proceeds to step S195, otherwise proceeds to step S196. In step S195, the CPU 201 sets coordinates of the text cursor 117.

In step S196, the CPU 201 judges whether or not the decision key 9 is pressed. If the decision key is pressed, the CPU 201 proceeds to step S197, otherwise proceeds to step S201. In step S197, the CPU 201 judges whether or not the selection cursor 119 exists on the send button. If the selection cursor 119 exists on the send button, the CPU 201 proceeds to step S198, otherwise proceeds to step S199. In step S198, the CPU 201 performs mail writing process.

In step S199, the CPU 201 judges whether or not the selection cursor 119 exists on the end button. If the selection cursor 119 exists on the end button, the CPU 201 proceeds to step S200, otherwise returns to the main routine. In step S200, the CPU 201 sets location information (horizontal and vertical coordinates) of objects for the menu screen (refer to FIG. 5).

In step S201, the CPU 201 sets a letter corresponding to the pressed key. In step S202, the CPU 201 sets coordinates of the text cursor 117.

Figure 27:
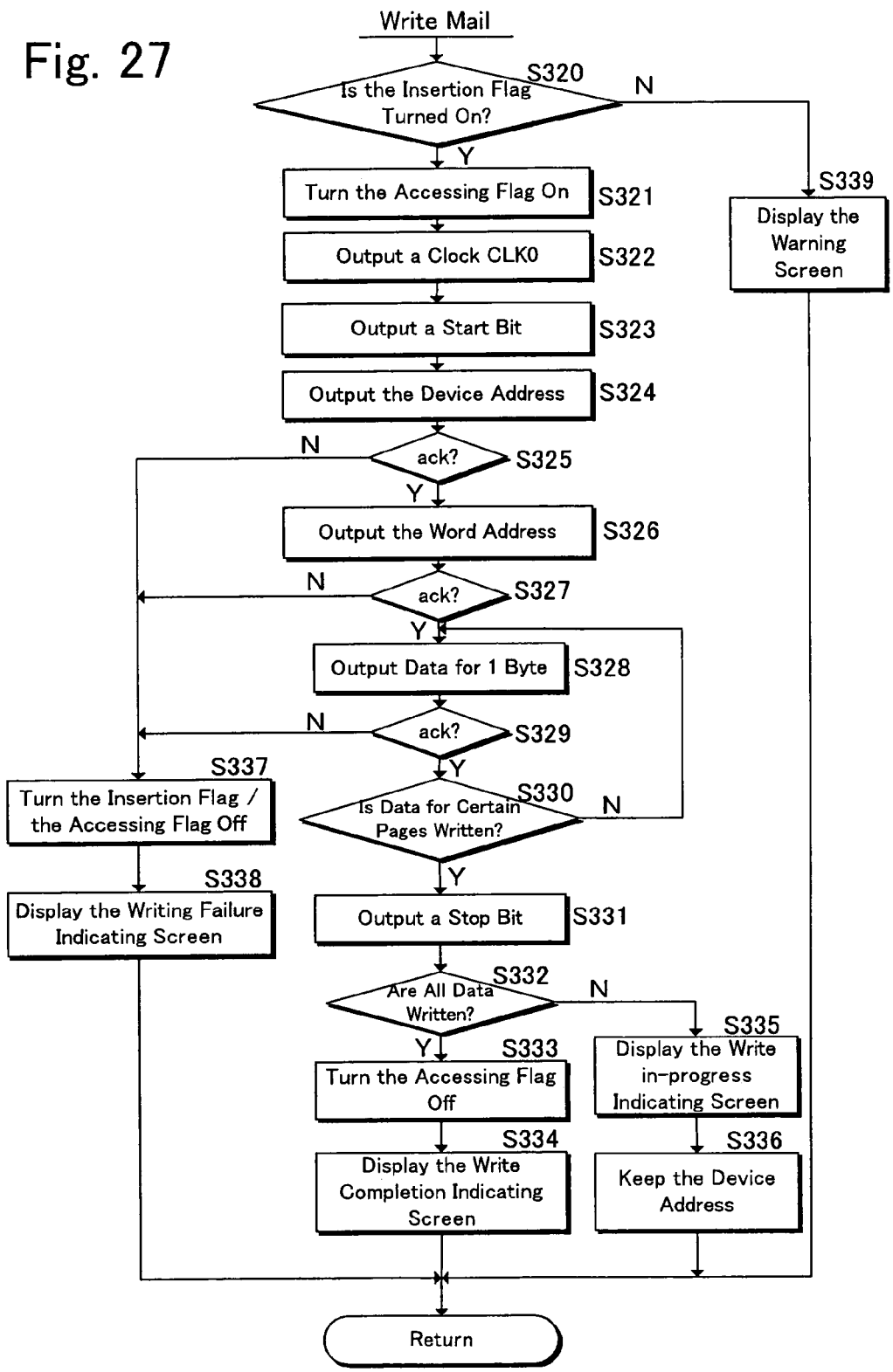
FIG. 27 is a flowchart showing the process flow of mail writing process in step S198 of FIG. 26.

FIG. 27 is a flowchart showing the process flow of the mail writing process in step S198 of FIG. 26. As illustrated in FIG. 27, the CPU 201 judges whether or not the insertion flag is turned on. If the insertion flag is turned on, the CPU 201 proceeds to step S321, otherwise proceeds to step S339 to set information for displaying warning. In step S321, the CPU 201 turns the accessing flag on. In step S322, the CPU 201 outputs the clock signal CLK0 to the EEPROM 174 through the input/output port IO13.

In step S323, the CPU 201 outputs a start bit to the EEPROM 174 through the input/output port IO12. In step S324, the CPU 201 outputs the device address to the EEPROM 174 through the input/output port IO12.

In step S325, the CPU 201 detects whether or not there is an "ack" signal as sent by the EEPROM 174. If the "ack" signal is detected, the CPU 201 proceeds to step S326, otherwise proceeds to step S337. In step S326, the CPU 201 outputs a word address to the EEPROM 174 through the input/output port IO12. In step S327, the CPU 201 detects whether or not there is an "ack" signal as sent by the EEPROM 174. If the "ack" signal is detected, the CPU 201 proceeds to step S328, otherwise proceeds to step S337.

In step S328, the CPU 201 writes one byte of data in the EEPROM 174 through the input/output port IO12. In step S329, the CPU 201 detects whether or not there is an "ack" signal as sent by the EEPROM 174. If the "ack" signal is detected, the CPU 201 proceeds to step S330, otherwise proceeds to step S337. In step S330, the CPU 201 judges whether or not the data for a predetermined number of pages has been written. If it has not been written yet, the CPU 201 proceeds to step S328, otherwise proceeds to step S331.

In step S331, the CPU 201 outputs a stop bit to the EEPROM 174 through the input/output port IO12. In step S332, the CPU judges whether or not all data has been written in the EEPROM 174. If all data has been written, the CPU 201 proceeds to step S333, otherwise proceeds to step S335.

In step S333, the CPU 201 turns the accessing flag off. In step S334, the CPU 201 sets information for displaying an image indicating completion of writing. On the other hand, the CPU 201 sets information for displaying an image indicating halfway of writing in step S335. In step S336, the CPU 201 holds the current device address.

In step S337, the CPU 201 turns the insertion flag and the accessing flag off. In step S338, the CPU 201 sets information for displaying an image indicating failure of writing.

Figure 28:
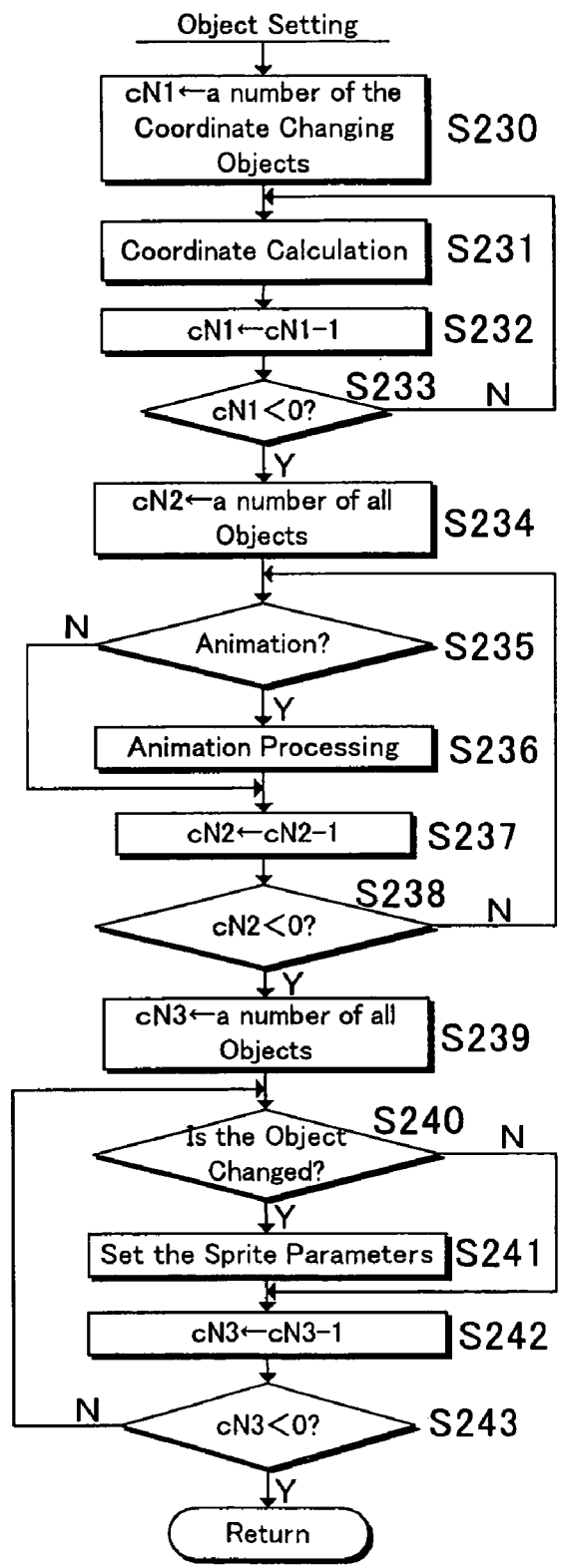
FIG. 28 is a flowchart showing the process flow of object setting in step S15 of FIG. 17.

FIG. 28 is a flowchart showing the process flow of the object setting in step S15 of FIG. 17. As illustrated in FIG. 28, in step S230, the CPU 201 sets the number of the objects whose coordinates change to the counter "cN1". In step S231, the CPU 201 considers that Vx=Vx+Ax, Vy=Vy+Ay, x=x+Vx and y=y+Vy. Incidentally, "Vx" indicates velocity of the object in horizontal direction; "Ax" indicates acceleration of the object in horizontal direction; "Vy" indicates velocity of the object in vertical direction; "Ay" indicates acceleration of the object in vertical direction; "x" is a horizontal coordinate of the object, and "y" is a vertical coordinate of the object.

In step S232, the CPU 201 decrements the counter "cN1". In step S233, the CPU 201 determines whether or not the counter "cN1" is smaller than "0". In other words, the CPU 201 determines whether or not coordinate calculation of step S231 has been performed for all objects whose coordinate changes. If the counter "cN1" is equal to or larger than "0", it means the coordinate calculation has not finished for all objects yet, therefore the CPU 201 proceeds to step S231. On the other hand, if the counter "cN1" is smaller than "0", it means the coordinate calculation has finished for all objects, therefore the CPU 201 proceeds to step S234.

In step S234, the CPU 201 sets the number of all objects to be displayed to a counter "cN2". In step S235, the CPU 201 judges whether or not the object is to be performed animation processing. If the object is to be performed the animation processing, the CPU 201 proceeds to step S236, otherwise proceeds to step S237. In step S236, the animation processing of the object is performed. More specifically, the CPU 201 stores, in the inner memory 207, storage location information of pixel pattern data of an object to be displayed in next frame.

In step S237, the CPU 201 decrements the counter "cN2". In step S238, the CPU 201 determines whether or not the counter "cN2" is smaller than "0". In other words, the CPU 201 judges whether or not the process of step S235 has been applied for all objects. If the counter "cN2" is smaller than "0", the CPU 201 proceeds to step S239, otherwise proceeds to step S235.

In step S239, the CPU 201 sets the number of all objects to be displayed to a counter "cN3". In step S240, the CPU 201 judges whether or not the object has been changed. If the object is changed, the CPU 201 proceeds to step S241, otherwise proceeds to step S242. In case where at least one of the depth value, the color palette information, the storage location information of the pixel pattern data, the horizontal coordinate and the vertical coordinate is changed, it is judged that the object is changed.

In step S241, the CPU 201 rewrites sprite parameters (the depth value, the color palette information, the storage location information of the pixel pattern data, the horizontal coordinate and the vertical coordinate) of the object after being changed. In this case, the CPU 201 only rewrites the sprite parameter(s) which has been changed.

In step S242, the CPU 201 decrements the counter "cN3". In step S243, the CPU 201 judges whether or not the counter "cN3" is smaller than "0". In other words, the CPU 201 judges whether or not the process of step S240 has been applied to all objects. If the counter "cN3" is equal to or larger than "0", the CPU 201 proceeds to step S240, otherwise returns to the main routine.

Returning to FIG. 17, the CPU 201 gives the sprite parameters to the graphic processor 202 in step S17. In addition, the graphic processor 202 reads the background related information from the inner memory 207 in step S17. Then, the graphic processor 202 generates the video signal VD on the basis of these information items.

Figure 29:
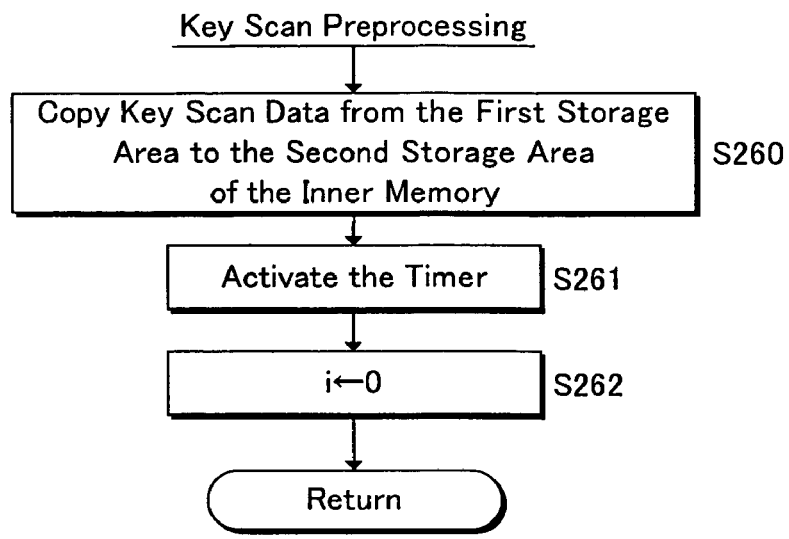
FIG. 29 is a flowchart showing the process flow of preprocessing of the key scan in step S19 of FIG. 17.

FIG. 29 is a flowchart showing the process flow of preprocessing of the key scan in step S19 of FIG. 17. As illustrated in FIG. 29, in step S260, the CPU 201 copies key scan data from the first storage area to the second storage area in the inner memory 207. In step S261, the CPU 201 activates the timer circuit 210. In step S262, the CPU 201 assigns "0" to the counter "i".

Figure 30:
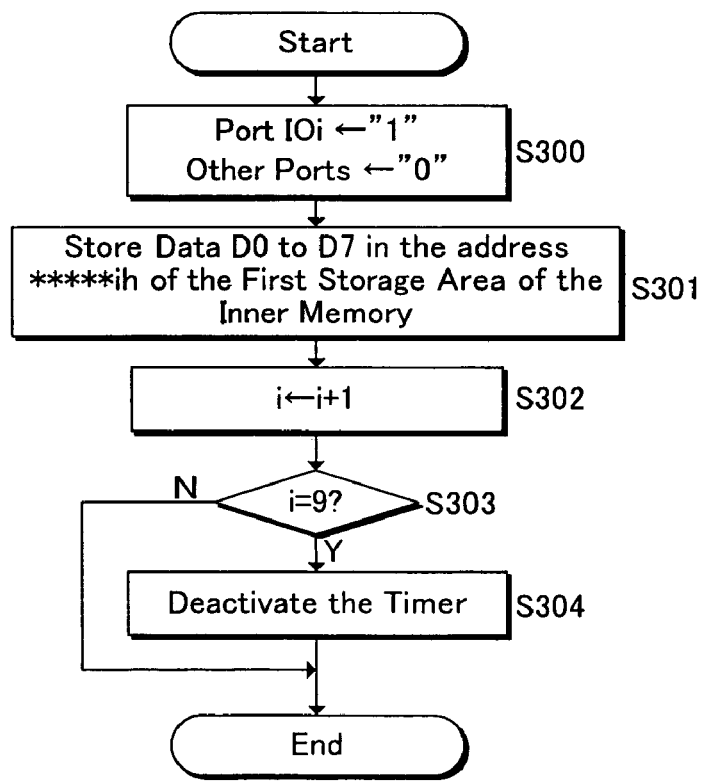
FIG. 30 is a flowchart showing the process flow of key scanning in step S20 of FIG. 17.

FIG. 30 is a flowchart showing the process flow of the key scanning in step S20 of FIG. 17. As illustrated in FIG. 30, in step S300, the CPU 201 sets "1" to the input/output port IOi for the key scanning, and also sets "0" to the other input/output ports for the key scanning. In step S301, the CPU 201 stores data D0 to D7 in the address *****ih of the first storage area of the inner memory 207. In step S302, the CPU 201 increments the counter "i". In step S303, the CPU 201 determines whether or not the counter "i" is "9". If the counter "i" is "9", the CPU 201 deactivates the timer circuit 210 in step S304, otherwise waits for the next timer interrupt.

In accordance with the embodiment of the present invention, since the image in accordance with the identification data corresponding to the appearance of the inserted memory cartridge, i.e., the object (animal object in this example) in the form of the appearance (animal in this example) of the inserted memory cartridge is displayed on the television monitor 500, the user who receives the memory cartridge can see, in addition to the mail message, the image corresponding to the appearance of the memory cartridge which inserted to the mail exchange apparatus 1. Therefore, the user can enjoy not only mail exchange, but also memory cartridge exchange as compared with the case where exchanging only the mail by using the general storage medium. Therefore, it is possible to provide the high-value added mail exchange apparatus 1.

In addition, the user can perform input operation in the similar way as the general mobile phone in the mobile phone input mode by using the character input keys 50 to 52, 62 to 64, 73 to 75 and 84 to 86 in the mobile phone key arrangement area 21. Because of this, it is possible to improve the convenience of the users who are familiar with input operation of the mobile phone. In addition, it is possible for users who do not have the mobile phone to feel as though they are using mobile phone keys.

Furthermore, since the memory cartridge ID0 and ID1 can record the identification data with a simple configuration, it is possible to reduce the cost. Especially, in case where the mail exchange apparatus 1 and the memory cartridge(s) are sold in one package, it is possible to restrain the price of the mail exchange system if it is sold with the memory cartridge ID0 and/or ID1. Therefore, it is possible to facilitate the spread of this mail exchange system. On the other hand, the memory cartridge ID0 and ID1 can provide only two kinds of identification data items (ID) due to the configuration. However, the memory cartridges ID2 to ID7 can provide many kinds of identification data items (ID). Therefore, if the cartridges ID2 to ID7 are sold alone, it is possible to sell various memory cartridges bearing different appearances. In this case, the cost becomes higher than the memory cartridge ID0 and ID1 because each memory cartridge ID2 to ID7 includes the shift register 176 and the cost of the shift register is added to the price of the memory cartridge. However, this is not considered to be expensive for the user because it is cheaper than the price of the mail exchange apparatus 1. Furthermore, the shift register 176 receives parallel data and outputs serial data, it is possible not only to provide a number of identification data items corresponding to the second power of (the number of the lines L20 to S27) but also to reduce the number of the terminals of the connector section 103 of each memory cartridge ID2 to ID7 and the number of the terminals of the socket 17 of the mail exchange apparatus 1.

Incidentally, the present invention is not limited to the above embodiment, and a variety of variations and modifications may be effected without departing from the spirit and scope thereof, as described in the following exemplary modifications.

(1) In above embodiment, the memory cartridges ID0 to ID7 are used as a storage medium. However, the storage medium is not limited thereto. For example, it is possible to use various storage mediums such as IC cards, magnetic cards and optical disks. In addition, it is possible to print an image of a character on the mediums.

(2) While any appropriate processor can be used as the processor 200 of FIG. 10, it is preferred to use the high speed processor in relation to which the applicant has been filed patent applications. The details of this high speed processor are disclosed, for example, in Jpn. unexamined patent publication No. 10-307790 and U.S. Pat. No. 6,070,205 corresponding thereto.

The invention has been described in detail above based on the embodiment, but it will be obvious to those skilled in the art that the invention is not limited to the embodiment described in the present application. The invention can be embodied in modified and changed modes without departing from the spirit and scope of the invention as defined by the appended claims. Accordingly, the description of the invention is intended for purposes of illustration and is in no way intended to limit the invention.

What is claimed is:

1. A mail exchange apparatus in which a storage medium storing identification data corresponding to appearance of the storage medium can be inserted, said mail exchange apparatus comprising:
 a memory unit operable to store a mail message and the identification data read from the inserted storage medium;
 a processor operable to display an image corresponding to the identification data stored in said memory unit and the mail message on a display device; and
 a plurality of letter input keys,
 wherein the identification data corresponding to appearance of the storage medium is fixedly stored in the storage medium in advance, and
 wherein a plurality of input modes, including a mobile phone input mode, is installed in the mail exchange apparatus, and
 in the mobile phone input mode, a predetermined number of letter input keys of said plurality of the letter input keys are assigned the same key arrangement as those of a mobile phone.

2. The mail exchange apparatus as claimed in claim 1, wherein said processor displays an object imitating the appearance of the storage medium as the image corresponding to the identification data on the display device.

3. A mail exchange system comprising:
 a plurality of storage mediums each of which has different appearance and identification data corresponding to its appearance;
 a mail exchange apparatus which reads a mail message and the identification data from said storage medium being inserted in said mail exchange apparatus, and displays an image corresponding to the identification data and the mail message on a display device; and
 a plurality of letter input keys,
 wherein said each storage medium is provided with a connector section to be connected with said mail exchange apparatus, and said plurality of the storage mediums has the same connector sections so as to be commonly insertable into said mail exchange apparatus,
 wherein the identification data corresponding to appearance of each storage medium is fixedly stored in the storage medium in advance, and
 wherein a plurality of input modes, including a mobile phone input mode, is installed in the mail exchange apparatus, and
 in the mobile phone input mode, a predetermined number of letter input keys of said plurality of the letter input keys are assigned the same key arrangement as those of mobile phone.

4. The mail exchange system as claimed in claim 3, wherein said each storage medium comprises;
 a first memory portion operable to store the identification data; and
 a second memory portion operable to store the mail message,
 wherein said first memory portion of a first storage medium of said plurality of the storage mediums includes a line which is connected to a corresponding terminal of said connector section and provides voltage information as the identification data of said first storage medium,
 a second storage medium of said plurality of the storage mediums further includes a shift register having an output terminal connected to a corresponding terminal of said connector section, and
 said first memory portion of said second storage medium includes a plurality of lines which is connected to a plurality of input terminals of said shift register and provides voltage information as the identification data of said second storage medium.

* * * * *